(12) United States Patent
Dahme et al.

(10) Patent No.: US 12,437,113 B1
(45) Date of Patent: Oct. 7, 2025

(54) DATA PROCESSING ORCHESTRATOR UTILIZING SEMANTIC TYPE INFERENCE AND PRIVACY PRESERVATION

(71) Applicant: K2 NETWORK LABS, INC., Dover, DE (US)

(72) Inventors: Harrison Dahme, Stateline, NV (US); Chris Martin, Seattle, WA (US); Nicholas Roberts-Huntley, New York, NY (US); Jason Johnson, Ashland, OR (US)

(73) Assignee: K2 NETWORK LABS, INC., Dover, DE (US)

( * ) Notice: Subject to any disclaimer, the term of this patent is extended or adjusted under 35 U.S.C. 154(b) by 0 days.

(21) Appl. No.: 19/204,523

(22) Filed: May 10, 2025

(51) Int. Cl.
  *G06F 21/62* (2013.01)
  *G06F 21/60* (2013.01)
  *G06N 7/01* (2023.01)

(52) U.S. Cl.
  CPC ........ *G06F 21/6254* (2013.01); *G06F 21/602* (2013.01); *G06N 7/01* (2023.01)

(58) Field of Classification Search
  CPC ...... G06F 21/6254; G06F 21/602; G06N 7/01
  See application file for complete search history.

(56) References Cited

U.S. PATENT DOCUMENTS

| | | | |
|---|---|---|---|
| 10,452,978 | B2 | 10/2019 | Shazeer |
| 10,740,433 | B2 | 8/2020 | Dehghani |
| 11,790,115 | B1 | 10/2023 | Townsend |
| 11,921,824 | B1 | 3/2024 | Hester |
| 12,205,575 | B2 | 1/2025 | Beaufays |

(Continued)

FOREIGN PATENT DOCUMENTS

WO 2024229857 A1 11/2024

OTHER PUBLICATIONS

A Differential Privacy Federated Learning Scheme with Improved Noise Perturbation; D.-S. Huang et al. (Eds.): ICIC 2024, LNCS 14870, pp. 61-71, 2024.

(Continued)

*Primary Examiner* — Stephen T Gundry
(74) *Attorney, Agent, or Firm* — CipherLaw

(57) ABSTRACT

The present disclosure provides a method and system for orchestrating automated data processing and transformation. A centralized orchestrator receives a request to process a client dataset and initiates a data ingestion process to obtain sample data. A semantic analysis module analyzes the sample data to determine semantic types of data fields. A transformation module generates data transformation instructions based on the determined semantic types. The orchestrator deploys a data processing pipeline to a client-controlled environment and configures privacy preservation parameters to identify and obfuscate potential personally identifiable information. The pipeline applies the transformation instructions and privacy parameters to the dataset. A configuration module determines data storage configurations for the transformed dataset. The transformed dataset is stored according to the configurations in a client-controlled or cloud environment. A machine learning module generates a model based on the transformed dataset, which is stored in a model repository accessible to the client.

20 Claims, 9 Drawing Sheets

(56) References Cited

U.S. PATENT DOCUMENTS

| | | | |
|---|---|---|---|
| 12,277,457 B1* | 4/2025 | Shetty | G06N 20/00 |
| 12,386,924 B1* | 8/2025 | Parwani | G06F 21/6245 |
| 12,393,889 B1* | 8/2025 | Shetty | G06Q 10/0631 |
| 2019/0034919 A1 | 1/2019 | Nolan | |
| 2020/0082226 A1 | 3/2020 | Shazeer et al. | |
| 2021/0303584 A1* | 9/2021 | Fan | G06F 16/2291 |
| 2021/0326717 A1* | 10/2021 | Mueller | G06Q 10/06 |
| 2021/0342359 A1* | 11/2021 | Roy | G06F 7/582 |
| 2022/0094554 A1 | 3/2022 | Sekar | |
| 2022/0270590 A1 | 8/2022 | Beaufays | |
| 2023/0281638 A1 | 9/2023 | Kaiser | |
| 2024/0007492 A1* | 1/2024 | Shen | H04L 63/1425 |
| 2024/0054406 A1* | 2/2024 | Bhise | G06F 18/2163 |
| 2024/0119364 A1* | 4/2024 | Jain | G06N 20/00 |
| 2024/0202225 A1 | 6/2024 | Siebel | |
| 2024/0388442 A1 | 11/2024 | Zyskind | |
| 2024/0427743 A1* | 12/2024 | Anusuri | G06F 16/258 |

OTHER PUBLICATIONS

Advanced Intelligent Computing Technology and Applications; 20th International Conference, ICIC 2024 Tianjin, China, Aug. 5-8, 2024 Proceedings, Part IX.

How to keep text private? A systematic review of deep learning methods for privacy-preserving natural language processing; Know-Center GmbH, Graz, Austria; Published online: May 21, 2022.

Zhang, Z.; Ma, X.; Ma, J. Local Differential Privacy Based Membership-Privacy-Preserving Federated Learning for Deep-Learning-Driven Remote Sensing. Remote Sens. 2023, 15, 5050. https://doi.org/10.3390/rs15205050.

Measuring and Controlling Split Layer Privacy Leakage Using Fisher Information; arXiv:2209.10119v1 [cs.CR] Sep. 21, 2022.

Privacy-preserving Federated Learning and its application to natural language processing; Knowledge-Based Systems 268 (2023) 110475.

Privacy-Preserving Graph Embedding based on Local Differential Privacy; arXiv:2310.11060v2 [cs.CR] Aug. 4, 2024.

Triad of Split Learning: Privacy, Accuracy, and Performance; 2021 International Conference on Information and Communication Technology Convergence (ICTC).

U-shaped Vertical Split Learning with Local Differential Privacy for Privacy Preserving; D.-S. Huang et al. (Eds.): ICIC 2024, LNCS 14870, pp. 72-81, 2024.

Exploring Dimensionality Reduction Techniques in Multilingual Transformers; arXiv:2204.08415v1 [cs.CL] Apr. 18, 2022.

Rajput, A.R.; Li, Q.; Ahvanooey, M.T. A Blockchain-Based Secret-Data Sharing Framework for Personal Health Records in Emergency Condition. Healthcare 2021, 9, 206. https://doi.org/10.3390/healthcare9020206.

Training Text-to-Text Transformers with Privacy Guarantees; Findings of the Association for Computational Linguistics: ACL 2022, pp. 2182-2193 May 22-27, 2022.

How Does a Deep Learning Model Architecture Impact Its Privacy? A Comprehensive Study of Privacy Attacks on CNNs and Transformers; arXiv:2210.11049v3 [cs.CR] Feb. 2, 2024.

Kalian, A.D.; Benfenati, E.; Osborne, O.J.; Gott, D.; Potter, C .; Dorne, J.-L.C.M.; Guo, M.; Hogstrand, C. Exploring Dimensionality Reduction Techniques for Deep Learning Driven QSAR Models of Mutagenicity. Toxics 2023, 11, 572. https://doi.org/10.3390/toxics11070572.

DPFormer: Learning Differentially Private Transformer on Long-Tailed Data; arXiv:2305.17633v1 [cs.LG] May 28, 2023.

Differentially Private Decoding in Large Language Models; [Submitted on May 26, 2022 (v1), last revised Sep. 8, 2022 (this version, v2)].

Differentially Private Fine-tuning of Language Models; arXiv:2110.06500v2 [cs.LG] Jul. 14, 2022.

Deep learning approach based on dimensionality reduction for designing electromagnetic nanostructures; Published: Feb. 4, 2020.

Transformer-based dimensionality reduction; arXiv:2210.08288v1 [cs.CV] Oct. 15, 2022.

Yang, D.; Tsai, W.-T. An Optimized Encryption Storage Scheme for Blockchain Data Based on Cold and Hot Blocks and Threshold Secret Sharing. Entropy 2024, 26, 690. https://doi.org/10.3390/e26080690.

Privacy-Preserving Split Learning via Patch Shuffling over Transformers; 2022 IEEE International Conference on Data Mining (ICDM).

Kiya, H.; Nagamori, T.; Imaizumi, S.; Shiota, S. Privacy-Preserving Semantic Segmentation Using Vision Transformer. J. Imaging 2022, 8, 233. https://doi.org/10.3390/jimaging8090233.

BOLT: Privacy-Preserving, Accurate and Efficient Inference for Transformers; 2023.

Zeng, C., He, D., Feng, Q., Yang, X. and Luo, Q., 2024. SecureGPT: A Framework for Multi-Party Privacy-Preserving Transformer Inference in GPT. IEEE Transactions on Information Forensics and Security. (Year: 2024).

Fu, X., Xiong, L., Li, F., Yang, X. and Xiong, N., 2024. Blockchain-Based Efficiently Privacy-Preserving Federated Learning Framework Using Shamir Secret Sharing. IEEE Transactions on Consumer Electronics. (Year: 2024).

* cited by examiner

DATA PROCESSING ORCHESTRATOR UTILIZING SEMANTIC TYPE INFERENCE AND PRIVACY PRESERVATION

FIELD OF INVENTION

The present disclosure relates to automated data processing and transformation systems, and more particularly to an orchestrated multi-agent system for privacy-preserving data transformation and analysis.

BACKGROUND

The field of automated data processing and transformation has witnessed significant advancements in recent years, driven by the exponential growth of digital information and the increasing complexity of data-driven decision-making processes. As organizations across various sectors grapple with the challenges of managing, analyzing, and deriving insights from vast amounts of data, there is a pressing need for sophisticated systems that can streamline these processes while ensuring data privacy and security.

Traditional approaches to data processing and transformation often involve manual intervention, which can be time-consuming, error-prone, and resource-intensive. These methods typically require extensive domain knowledge and technical expertise, limiting the ability of organizations to efficiently leverage their data assets. Moreover, the heterogeneous nature of data sources and formats presents additional challenges in terms of data integration, normalization, and quality assurance.

The advent of machine learning and artificial intelligence technologies has opened new avenues for automating various aspects of data processing and analysis. However, the implementation of these technologies often requires substantial investments in infrastructure, specialized skills, and ongoing maintenance. Furthermore, the black-box nature of many machine learning models raises concerns about interpretability and transparency, particularly in regulated industries where decision-making processes need to be explainable and auditable.

Another significant challenge in the realm of data processing and transformation is the preservation of data privacy and compliance with increasingly stringent regulatory frameworks. As data breaches and privacy violations continue to make headlines, organizations face mounting pressure to implement robust safeguards for sensitive information. This has led to the development of various privacy-preserving techniques, such as homomorphic encryption. However, these methods often come with trade-offs in terms of computational overhead and utility of the processed data.

The scalability of data processing systems is another area of concern, particularly as the volume and velocity of data continue to grow. Many existing solutions struggle to handle large-scale datasets efficiently, leading to bottlenecks in data pipelines and delayed insights. This limitation is particularly pronounced in real-time or near-real-time processing scenarios, where timely analysis is crucial for decision-making.

Interoperability between different data processing tools and platforms remains a persistent challenge. Organizations often find themselves locked into specific ecosystems or forced to develop custom integrations, which can be costly and time-consuming. The lack of standardized interfaces and data exchange formats further exacerbates this issue, hindering the seamless flow of information across different stages of the data processing lifecycle.

The complexity of modern data ecosystems also poses challenges in terms of data governance and lineage tracking. As data moves through various transformation and analysis stages, maintaining a clear audit trail becomes increasingly difficult. This complexity can impede efforts to ensure data quality, comply with regulatory requirements, and trace the provenance of insights derived from the data.

In the context of multi-tenant or collaborative data processing environments, balancing data access and security becomes particularly challenging. Organizations need to implement fine-grained access controls and data isolation mechanisms to prevent unauthorized access or data leakage between different users or departments. However, overly restrictive security measures can hinder collaboration and limit the potential for cross-functional insights.

The dynamic nature of business requirements and data sources necessitates flexible and adaptable data processing systems. Many existing solutions lack the agility to quickly accommodate changes in data schemas, processing logic, or analytical requirements. This rigidity can lead to delays in implementing new data-driven initiatives and may result in missed opportunities for innovation.

In light of these challenges, there is a clear need for innovative approaches to data processing and transformation that can address the multifaceted requirements of modern organizations. Such solutions should ideally combine automation, scalability, privacy preservation, and ease of use, while remaining flexible enough to adapt to evolving business needs and technological landscapes.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

According to an aspect of the present disclosure, a method, system, and non-transitory computer-readable medium for orchestrating automated data processing and transformation are provided. The method, system, and computer-readable medium include receiving a request to process a dataset associated with a client, initiating a data ingestion process to obtain sample data from the dataset, wherein the data ingestion process is executed on client premises or in a cloud environment, and analyzing the sample data to determine semantic types of data fields within the dataset.

The method, system, and computer-readable medium further include generating data transformation instructions based on the determined semantic types, deploying a data processing pipeline to a client-controlled environment, wherein the pipeline is executed within the client premises, and configuring privacy preservation parameters for the data processing pipeline to identify and obfuscate potential personally identifiable information (PII) in the dataset. The data processing pipeline is then instructed to apply the data transformation instructions and privacy preservation parameters to the dataset.

Additionally, the method, system, and computer-readable medium include determining data storage configurations for the transformed dataset, directing the storage of the transformed dataset according to the determined data storage configurations, wherein the storage occurs in a client-controlled environment or a cloud environment, generating a machine learning model based on the transformed dataset, and storing the machine learning model in a model repository accessible to the client.

According to other aspects of the present disclosure, the method, system, and computer-readable medium may include one or more of the following features. Access controls for the transformed dataset or machine learning model may be implemented through role-based permission systems with cryptographic verification. Data lineage throughout the transformation process may be tracked using a directed acyclic graph (DAG) representation with cryptographic hashes. Query performance on the transformed dataset may be optimized using automated indexing based on identified access patterns. Recurring data processing jobs may be scheduled based on configurable parameters. Programmatic access to the orchestrated functionalities may be provided through APIs.

The analysis of sample data to determine semantic types may include applying a transformer-based machine learning classifier to predict semantic types, validating the predicted semantic types using pattern matching or contextual analysis, generating confidence scores for one or more predicted semantic types, refining the semantic type predictions based on statistical analysis of the sample data, or generating human-readable descriptions of identified semantic types.

The generation of data transformation instructions may involve identifying one or more required data normalization steps based on the determined semantic types, generating SQL-based transformation queries to standardize data formats, creating data quality validation rules to ensure consistency of transformed data, optimizing the transformation instructions for distributed execution, or automatically generating documentation of transformation logic.

The configuration of privacy preservation parameters may include implementing k-anonymity algorithms for categorical data fields, creating encrypted views of sensitive data fields while maintaining referential integrity, or generating privacy impact assessments that quantify re-identification risk.

The deployment of the data processing pipeline may involve generating a directed acyclic graph (DAG) representation of the transformation steps, optimizing the DAG for parallel execution based on data dependencies, implementing checkpointing mechanisms to ensure pipeline resilience, dynamically scaling pipeline resources based on data volume, or implementing secure communication channels between pipeline components.

The generation of the machine learning model may include selecting model architectures based on the semantic types identified in the transformed dataset, implementing distributed learning techniques to train models while preserving data privacy, applying transfer learning to leverage pre-trained models relevant to the identified semantic types, or continuously refining the model using incremental learning techniques.

The foregoing general description of the illustrative embodiments and the following detailed description thereof are merely exemplary aspects of the teachings of this disclosure and are not restrictive.

BRIEF DESCRIPTION OF FIGURES

Non-limiting and non-exhaustive examples are described with reference to the following figures.

DETAILED DESCRIPTION

The following description sets forth exemplary aspects of the present disclosure. It should be recognized, however, that such description is not intended as a limitation on the scope of the present disclosure. Rather, the description also encompasses combinations and modifications to those exemplary aspects described herein.

A detailed description of systems, devices, and methods consistent with embodiments of the present disclosure is provided below. While several embodiments are described, it should be understood that disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Dataset Processing Method Overview

Figure 1:
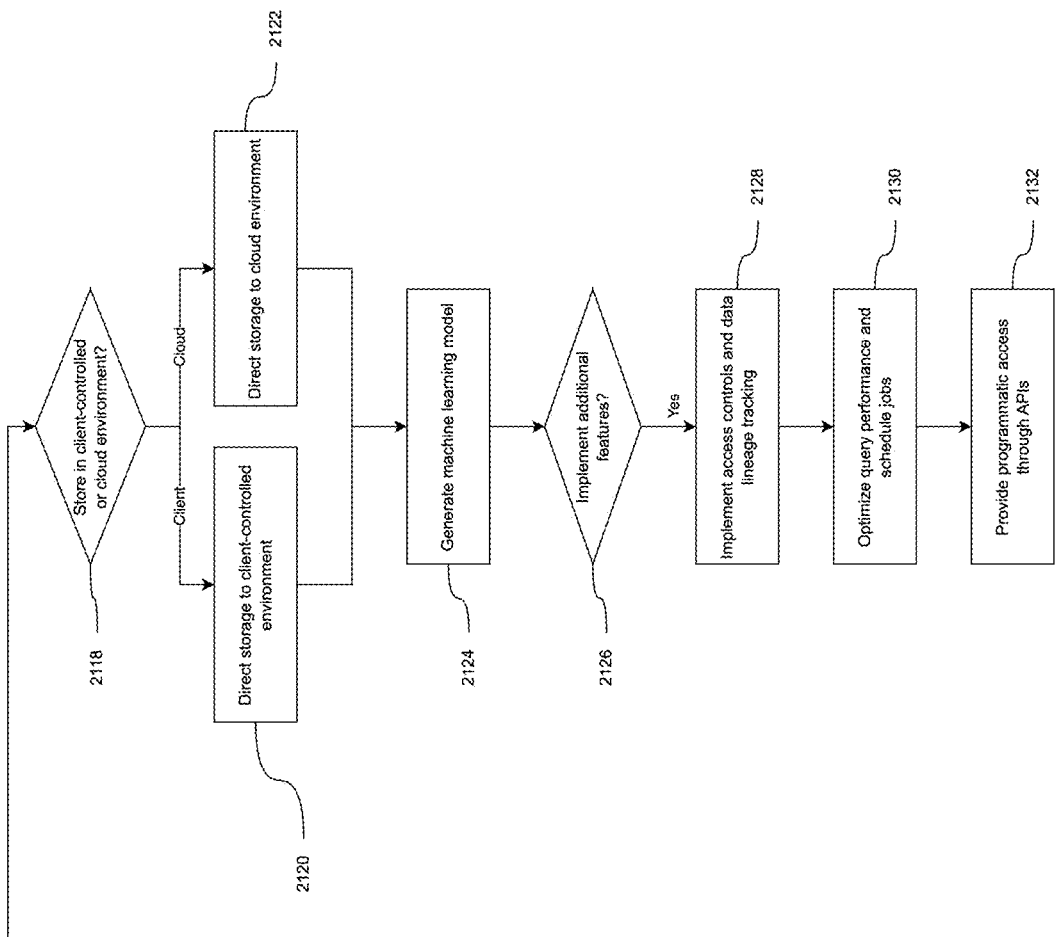
FIG. 1 illustrates a flowchart for a dataset processing method, according to aspects of the present disclosure.
Figure 1:
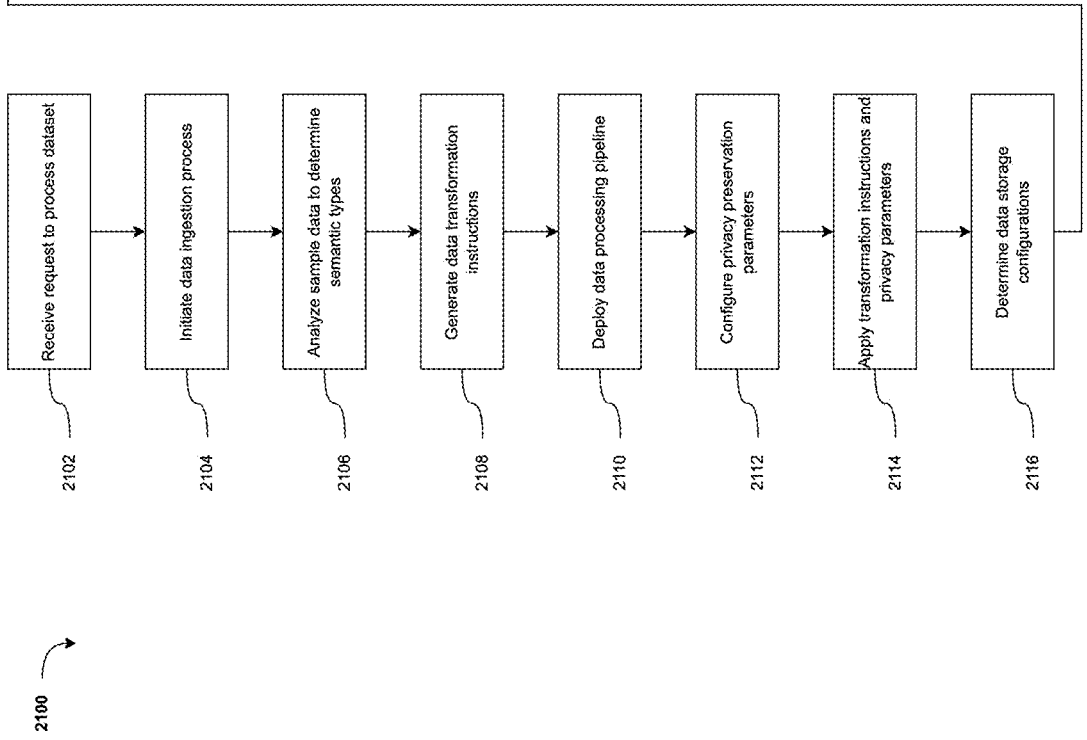

FIG. 1 illustrates a flowchart for a dataset processing method (2100). The method (2100) represents an approach to automated data processing and transformation, with a focus on orchestrated operations and privacy-preserving features. This method may be implemented in various computing environments, including distributed systems, cloud platforms, and on-premises infrastructures.

The dataset processing method (2100) is managed by a centralized orchestrator, which may be implemented on a server system comprising at least one processor and memory. In some cases, the centralized orchestrator may be distributed across multiple physical or virtual machines to enhance scalability and fault tolerance. The orchestrator may utilize a microservices architecture, allowing for modular and independently scalable components. This design choice may facilitate easier updates and maintenance of individual system components without affecting the entire system.

The centralized orchestrator is engineered to handle multiple clients concurrently, with, in some example embodiments, each dataset associated with a unique client identifier and dataset identifier. This approach allows for scalable and organized data management across various clients. The client and dataset identifiers may be generated using cryptographically secure methods, such as UUID version 4 or higher, to ensure uniqueness and reduce the probability of collisions. In some implementations, these identifiers may be further enhanced with additional metadata, such as timestamps or organizational hierarchies, to facilitate more granular data management and access control.

The method (2100) commences with a step (2102) where the centralized orchestrator receives a request to process a dataset associated with a client. This initial step triggers a cascade of orchestrated actions that guide the dataset through various processing stages. The request may be received through multiple channels, such as a RESTful API, gRPC, message queues, or even through a graphical user interface. The request payload may include various parameters such as the desired processing operations, priority levels, and specific constraints or preferences for data handling.

Following the receipt of the processing request, the method (2100) advances to a step (2104) where a data ingestion process is initiated. The data ingestion process may be executed in diverse environments to accommodate different client requirements and infrastructure setups. In some cases, this process may occur on client premises, utilizing edge computing devices or on-site servers. Alternatively, the ingestion may take place in a cloud environment, leveraging cloud-native services for data intake and initial processing. The choice between on-premises and cloud ingestion may depend on factors such as data volume, network bandwidth, latency requirements, and data residency regulations.

The data ingestion process may employ various techniques to efficiently handle large volumes of data. These techniques may include parallel processing, data streaming, and incremental updates. In some implementations, the ingestion process may utilize change data capture (CDC) mechanisms to identify and process only the delta changes since the last ingestion, thereby optimizing resource utilization and reducing processing time.

The method (2100) then progresses to a step (2106) where sample data is analyzed to determine semantic types. This analysis forms the foundation for subsequent data transformation and processing steps, enabling the system to understand the structure and meaning of the data it is handling. The semantic analysis may employ machine learning algorithms, such as natural language processing (NLP) models or deep learning networks, to automatically classify data fields and infer their semantic meanings.

In some cases, the semantic analysis may utilize pretrained models that have been fine-tuned on domain-specific datasets to improve accuracy and efficiency. The analysis may also incorporate external knowledge bases or ontologies to enrich the semantic understanding of the data. The system may employ techniques such as entity recognition, relationship extraction, and contextual analysis to build a comprehensive semantic model of the dataset.

Based on the semantic analysis, the method (2100) transitions to a step (2108) where data transformation instructions are generated. These instructions can be tailored to the specific characteristics of the dataset, as identified in the previous step. The transformation instructions may be represented in a domain-specific language (DSL) or as a series of abstract syntax trees (ASTs) that can be efficiently parsed and executed by the data processing pipeline.

The generation of transformation instructions may involve complex decision-making processes, potentially utilizing expert systems or rule engines. These systems may consider factors such as data quality, consistency requirements, target schema specifications, and performance optimizations. In some implementations, the instruction generation process may leverage historical data and machine learning models to suggest optimal transformation strategies based on past successes with similar datasets.

In step (2110), the centralized orchestrator deploys a data processing pipeline. This pipeline is typically deployed to a client-controlled environment, where it is executed within the client premises. This approach allows for greater control and security of sensitive data processing operations. The deployment process may involve container orchestration technologies such as Kubernetes or Docker Swarm to ensure consistent and reproducible pipeline execution across different environments.

The data processing pipeline may be composed of modular, reusable components that can be dynamically assembled based on the specific requirements of each dataset. These components may include data cleaners, transformers, validators, and enrichment modules. The pipeline architecture may support both batch and stream processing paradigms, allowing for flexible handling of different data velocities and volumes.

The method (2100) then advances to a step (2112) where privacy preservation parameters are configured. These parameters are instrumental in identifying and protecting potentially sensitive information within the dataset. The privacy preservation configuration may involve techniques such as data masking, tokenization, or homomorphic encryption. The specific combination and parameterization of these techniques may be determined based on the sensitivity of the data, regulatory requirements, and the intended use of the processed dataset.

In some implementations, the privacy preservation parameters may be dynamically adjusted based on real-time risk assessments. This may involve continuous monitoring of data patterns and potential re-identification risks, with automatic parameter tuning to maintain an optimal balance between data utility and privacy protection.

Following the configuration of privacy parameters, the method (2100) proceeds to a step (2114) where the centralized orchestrator instructs the data processing pipeline to apply the data transformation instructions and privacy preservation parameters to the dataset. This step represents a processing phase where the actual data transformation and privacy protection measures are implemented. The processing may be distributed across multiple nodes for parallel execution, with careful orchestration to ensure data consistency and integrity throughout the transformation process.

The data processing pipeline may employ advanced techniques such as data sharding, pipelining, and adaptive query optimization to enhance performance. In some cases, the pipeline may utilize hardware acceleration, such as GPUs or FPGAs, for computationally intensive operations like encryption or complex transformations.

The method (2100) then transitions to a step (2116) where data storage configurations are determined. These configurations dictate how and where the processed data will be stored. The storage configuration process may consider factors such as data access patterns, query performance requirements, data lifecycle management, and compliance with data retention policies. The system may employ various storage technologies, including relational databases, NoSQL databases, data lakes, and distributed file systems, depending on the nature of the processed data and its intended use.

After determining the storage configurations, the method (2100) reaches a decision step (2118). At this juncture, a choice is made between storing the transformed dataset in a client-controlled environment or a cloud environment. This decision may be influenced by a multitude of factors, including data sensitivity, regulatory requirements, client preferences, cost considerations, and performance needs. The decision-making process may involve complex algorithms that weigh these factors against predefined policies and service level agreements.

If client storage is selected, the method (2100) proceeds to a step (2120) where the transformed dataset is directly stored in the client-controlled environment. This may involve integrating with the client's existing data infrastructure, such as on-premises data centers or private clouds. The storage process may include data partitioning, indexing, and the creation of appropriate access control mechanisms to ensure secure and efficient data retrieval.

Alternatively, if cloud storage is chosen, the method (2100) advances to a step (2122) for direct storage in the cloud environment. This may leverage cloud-native storage services, potentially across multiple cloud providers for enhanced reliability and data sovereignty compliance. The cloud storage solution may incorporate features such as automatic scaling, geo-replication, and serverless access patterns to optimize cost and performance.

Following the storage of the transformed dataset, the method (2100) progresses to a step (2124) where a machine learning model is generated based on the processed data. This model generation process may involve automated feature engineering, model selection, and hyperparameter tuning. The system may employ techniques such as AutoML, transfer learning, and ensemble methods to create robust and accurate models. In some implementations, the model generation process may be iterative, with continuous evaluation and refinement based on new data and feedback loops.

The method (2100) then reaches another decision step (2126) to determine whether to implement additional features. These features may encompass various enhancements or optimizations to the processed dataset or the generated model. The decision to implement additional features may be based on predefined quality metrics, performance benchmarks, or specific client requirements.

If additional features are deemed necessary, the method (2100) proceeds through steps (2128), (2130), and (2132) to implement these features. Step (2128) may involve the implementation of access controls, potentially utilizing fine-grained, attribute-based access control (ABAC) systems. Data lineage tracking may also be implemented in this step, possibly using graph-based representations to capture the complete data transformation journey.

Step (2130) may focus on query performance optimization, employing techniques such as materialized views, adaptive indexing, and query result caching. This step may also involve the scheduling of recurring data processing jobs, potentially utilizing advanced scheduling algorithms that consider resource availability, data dependencies, and priority levels.

In step (2132), the method may provide programmatic access through APIs. This may involve the generation of comprehensive API documentation, the implementation of rate limiting and quota management, and the provision of software development kits (SDKs) in multiple programming languages to facilitate easy integration with client systems.

In certain implementations, the entire method (2100) may be encapsulated as instructions stored on a non-transitory computer-readable medium. When executed by one or more processors, these instructions cause the processors to perform the operations described in the method (2100). This approach allows for portable and reproducible deployment of the data processing system across various computing environments.

The dataset processing method (2100) exemplifies a sophisticated, orchestrated approach to data management, emphasizing privacy preservation, scalability, and adaptability. By managing the flow of data through various processing stages while maintaining robust privacy and security measures, the system demonstrates significant potential for wide-ranging applications in data processing and transformation tasks across diverse industries and use cases.

Centralized Orchestrator Architecture

The centralized orchestrator, which serves as the cornerstone of the dataset processing method (2100), may be implemented using a variety of architectural patterns and technologies to ensure robustness, scalability, and flexibility. In some cases, the orchestrator may be built on a microservices architecture, where each major function is encapsulated within its own service. This approach allows for independent scaling and updating of individual components, enhancing the system's overall maintainability and resilience.

The orchestrator may utilize a combination of synchronous and asynchronous communication patterns to manage the flow of data and control signals throughout the processing pipeline. For synchronous operations that require immediate responses, the orchestrator may employ RESTful APIs or gRPC for efficient, low-latency communication. Asynchronous operations, which may include long-running processes or event-driven workflows, may be handled through message queues or event streaming platforms such as Apache Kafka or RabbitMQ.

To manage the state of multiple concurrent processing jobs, the orchestrator may implement a distributed state management system. This system may utilize technologies such as distributed caches (e.g., Redis, Memcached) or consensus algorithms (e.g., Raft, Paxos) to maintain consistency across multiple nodes. The state management system ensures that the orchestrator can recover from failures and continue processing jobs seamlessly, even in the event of node outages or network partitions.

The orchestrator may also incorporate a rules engine to dynamically determine the sequence and parameters of processing steps based on the characteristics of each dataset and client-specific requirements. This rules engine may be implemented using technologies such as Drools or Apache Nifi, allowing for the definition of complex processing logic that can be easily updated without requiring changes to the core orchestrator code.

To handle varying workloads and optimize resource utilization, the orchestrator may employ auto-scaling mechanisms. These mechanisms may dynamically adjust the number of processing nodes or containers based on current demand, CPU utilization, memory usage, or custom metrics. Auto-scaling may be implemented using cloud-native services or container orchestration platforms like Kubernetes, ensuring that the system can efficiently handle both peak loads and periods of low activity.

The orchestrator may also implement sophisticated monitoring and logging systems to provide real-time visibility into the processing pipeline's performance and health. These systems may utilize technologies such as Prometheus for metrics collection, Grafana for visualization, and the ELK stack (Elasticsearch, Logstash, Kibana) for log aggregation and analysis. Advanced anomaly detection algorithms may be applied to these monitoring data streams to proactively identify and address potential issues before they impact processing performance or data integrity.

To ensure high availability and disaster recovery capabilities, the orchestrator may be designed with redundancy and geographical distribution in mind. This may involve deploying the orchestrator across multiple availability zones or regions, with automatic failover mechanisms to redirect traffic in case of localized outages. Data replication and backup strategies may be employed to safeguard against data loss, with regular testing of recovery procedures to validate the system's resilience.

The orchestrator's security architecture may incorporate multiple layers of protection, including network segmentation, encryption of data in transit and at rest, and robust authentication and authorization mechanisms. Identity and access management may be implemented using standards such as OAuth 2.0 and OpenID Connect, potentially integrated with enterprise identity providers for seamless single sign-on experiences. Regular security audits and penetration testing may be conducted to identify and address potential vulnerabilities in the orchestrator's implementation.

In some cases, the orchestrator may incorporate machine learning capabilities to optimize its own performance over time. This may include predictive scaling based on historical usage patterns, automated tuning of processing parameters, and intelligent routing of jobs to the most suitable processing resources based on learned performance characteristics.

The orchestrator's API layer may be designed with extensibility in mind, allowing for the easy integration of new processing modules or third-party services. This extensibility may be achieved through the use of plugin architectures or serverless computing paradigms, enabling clients or third-party developers to extend the system's capabilities without modifying the core orchestrator code.

To facilitate compliance with various regulatory frameworks, the orchestrator may implement comprehensive audit logging and reporting capabilities. These features may track all data access and processing activities, providing detailed records for compliance audits and data governance purposes. The audit logs may be stored in tamper-evident formats, potentially leveraging blockchain or similar technologies to ensure the integrity and non-repudiation of the recorded events.

The orchestrator's design may also consider edge computing scenarios, where certain processing tasks need to be performed closer to the data source for latency or bandwidth reasons. In such cases, the orchestrator may employ edge-specific protocols and lightweight processing agents that can operate in resource-constrained environments while still maintaining coordination with the central orchestration logic.

By incorporating these advanced architectural features and technologies, the centralized orchestrator provides a robust and flexible foundation for the dataset processing method (2100), capable of adapting to diverse processing requirements and operating environments while maintaining high levels of performance, security, and reliability.

Semantic Type Prediction Process

Figure 2:
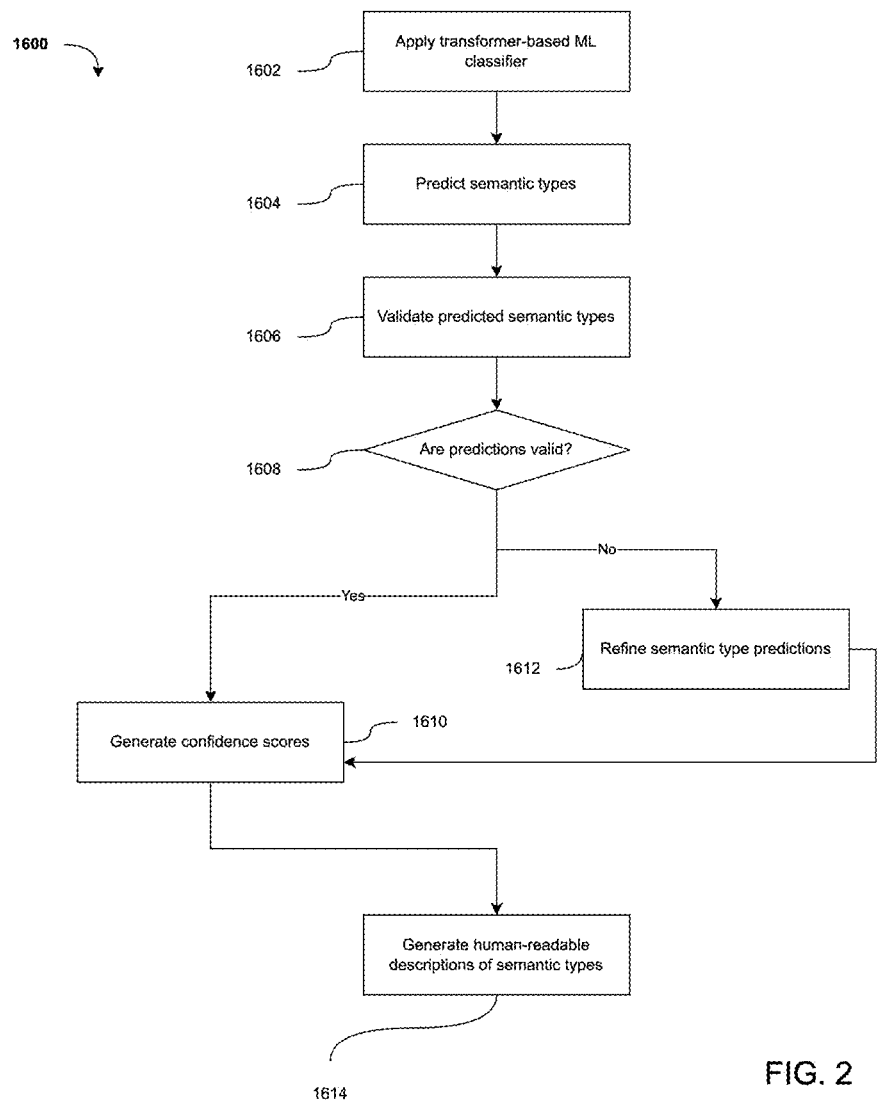
FIG. 2 illustrates a flowchart for a semantic type prediction method, according to an embodiment.

FIG. 2 illustrates a flowchart for a semantic type prediction method (1600) that represents a comprehensive approach to analyzing and categorizing data fields within a dataset. The method (1600) utilizes advanced machine learning techniques and validation processes to achieve accurate and reliable semantic type predictions.

The method (1600) commences with a step (1602) of applying a transformer-based machine learning classifier. This classifier may be implemented using state-of-the-art natural language processing architectures, such as BERT (Bidirectional Encoder Representations from Transformers), GPT (Generative Pre-trained Transformer), or their variants. The transformer architecture allows the classifier to capture complex contextual relationships within the data, enabling it to recognize intricate patterns and characteristics associated with various semantic types.

The classifier may be pre-trained on a diverse corpus of data, encompassing a wide range of data types and structures. This pre-training process may involve unsupervised learning on large-scale datasets, allowing the model to develop a broad understanding of language and data patterns. The pre-training may utilize techniques such as masked language modeling or next sentence prediction to build a robust foundation for semantic understanding.

In some implementations, the classifier may undergo fine-tuning on domain-specific datasets to enhance its accuracy for particular industries or data contexts. This fine-tuning process may involve supervised learning on labeled datasets that are representative of the target domain. The fine-tuning may be performed using techniques such as transfer learning, where the pre-trained model's weights are adjusted to better fit the specific characteristics of the domain-specific data.

Following the application of the classifier, the method (1600) advances to a step (1604) where semantic types are predicted. During this step, the classifier processes each data field in the input dataset and assigns probable semantic types based on its learned patterns and the characteristics of the input data. The prediction process may involve feeding the data through multiple layers of the transformer architecture, with each layer capturing increasingly abstract representations of the input.

The semantic type predictions may encompass a wide range of categories, including but not limited to:

1. Temporal data types: dates, times, timestamps, durations
2. Personal information: names, addresses, phone numbers, email addresses, social security numbers
3. Geographical data: coordinates, postal codes, country codes
4. Financial information: currency amounts, account numbers, transaction IDs
5. Categorical data: gender, product categories, industry classifications
6. Numerical data: integers, floating-point numbers, percentages
7. Text-based data: free-form text, product descriptions, comments
8. Binary data: boolean values, flags, indicators
9. Specialized domain-specific types: medical codes, legal case numbers, scientific notation The prediction process may also consider the structural characteristics of the data field, such as its length, format, and position within the dataset. In some cases, the classifier may generate multiple candidate semantic types for a single field, along with associated probability scores.

The method (1600) then progresses to a step (1606) where the predicted semantic types undergo validation. This validation process may employ a multi-faceted approach to ensure the accuracy and consistency of the predictions. One technique that may be utilized is pattern matching, where regular expressions or other formal grammars are applied to verify that the data conforms to expected formats for the predicted type. For instance, a field predicted to contain email addresses may be validated against a regular expression pattern such as:

This pattern checks for the presence of a local part, an "@" symbol, a domain name, and a top-level domain, which are characteristic elements of a valid email address.

In addition to pattern matching, the validation process may incorporate contextual analysis. This approach examines the relationships between different fields within the dataset to confirm that the predicted types are logically consistent within the broader data structure. For example, if a field is predicted to be a "country" type, the validation process may check if other related fields, such as "city" or "postal code," align with the expected values for that country.

The validation process may also leverage external knowledge bases or ontologies to cross-reference the predicted types against known entities and relationships. This may involve techniques such as entity linking or semantic web technologies to connect the predicted types to standardized vocabularies or domain-specific taxonomies.

After the validation process, the method (1600) reaches a decision step (1608) where it determines if the predictions meet predefined criteria for validity. These criteria may be based on multiple factors, including:
1. Confidence thresholds: A minimum confidence score that predictions must exceed to be considered valid.
2. Consistency metrics: Measures of how well the predicted types align with each other and with the overall dataset structure.
3. Validation success rate: The proportion of data fields that pass the pattern matching and contextual analysis checks.
4. Domain-specific rules: Custom validation criteria tailored to the specific requirements of the data domain or use case.

If the predictions do not meet these validity criteria, the method (1600) proceeds to a step (1612) where semantic type predictions are refined. This refinement process may involve several strategies to improve the accuracy of the predictions:
1. Hyperparameter tuning: Adjusting the classifier's parameters, such as learning rate, batch size, or model architecture, to optimize performance.
2. Ensemble methods: Combining predictions from multiple classifiers or model variants to create a more robust prediction.
3. Active learning: Incorporating human feedback on a subset of uncertain predictions to guide the refinement process.
4. Feature engineering: Creating new input features or transforming existing ones to provide more discriminative information to the classifier.
5. Data augmentation: Generating synthetic examples to expand the training dataset and improve the model's generalization capabilities.

The refinement process may be iterative, with multiple rounds of adjustment and re-evaluation until the predictions meet the validity criteria or a maximum number of iterations is reached.

If the predictions are deemed valid at the decision step (1608), or after the refinement process in step (1612), the method (1600) transitions to a step (1610) where confidence scores are generated. These scores quantify the level of certainty associated with each semantic type prediction, providing a measure of reliability for downstream processes that may rely on these predictions.

The confidence scores may be derived through various methods:
1. Softmax probabilities: For classification-based approaches, the softmax output of the final layer may be used as a direct measure of confidence.
2. Ensemble agreement: In cases where multiple models or classifiers are used, the degree of agreement between them may be used to calculate confidence.
3. Distance-based metrics: For nearest-neighbor or clustering-based approaches, the distance or similarity to known exemplars may be used to derive confidence scores.
4. Bayesian methods: Techniques such as Gaussian Process classification or Bayesian Neural Networks may provide uncertainty estimates as part of their prediction process.
5. Calibration techniques: Methods like Platt scaling or isotonic regression may be applied to raw model outputs to produce well-calibrated probability estimates.

The confidence scores may be normalized to a common scale (e.g., 0 to 1) to facilitate interpretation and comparison across different semantic types and data fields.

The final step in the method (1600) is a step (1614) where human-readable descriptions of semantic types are generated. These descriptions serve to translate the technical classifications into easily understandable terms, facilitating communication between the system and human users or domain experts.

The generation of human-readable descriptions may utilize natural language generation (NLG) techniques, potentially leveraging pre-trained language models or template-based approaches. The descriptions may include:
1. A concise definition of the semantic type
2. Examples of typical values or formats for the type
3. Explanations of how the type relates to other fields in the dataset
4. Potential use cases or implications of the semantic type in data analysis
5. Any caveats or limitations associated with the type prediction For example, a human-readable description for a field predicted to be of type "geolocation_coordinate" might be:

"This field contains geographical coordinate data, likely representing latitude and longitude values. The data is formatted as decimal degrees, with a precision of up to 6 decimal places. This type of data is commonly used in mapping applications, location-based services, or spatial analysis. Related fields in the dataset may include address information or place names."

Throughout the semantic type prediction process, a question decomposition agent may be employed to enhance the accuracy and granularity of the predictions. This agent may utilize techniques from question answering systems and natural language understanding to break down complex queries about the data into focused sub-questions. For example, a high-level question like "What types of personal information are present in this dataset?" may be decomposed into more specific queries about names, addresses, identification numbers, and other relevant categories.

The question decomposition process may involve:
1. Parsing the input query using syntactic and semantic analysis
2. Identifying key entities and relationships within the query
3. Mapping query components to relevant semantic type categories
4. Generating a set of atomic sub-questions that collectively address the original query
5. Prioritizing and sequencing the sub-questions for efficient processing By breaking down complex queries, the system can analyze data fields from multiple perspectives, potentially uncovering nuanced semantic relationships that might be missed by a more monolithic approach.

The semantic type prediction method (1600) may also incorporate statistical analysis techniques to further refine and validate the predictions. These techniques may include:
1. Distribution analysis: Examining the statistical properties of values within each field, such as mean, median, variance, and higher-order moments.
2. Outlier detection: Identifying anomalous values that deviate significantly from the expected distribution for a given semantic type.
3. Correlation analysis: Assessing the relationships between different fields to uncover potential dependencies or associations that may inform semantic type predictions.
4. Time series analysis: For temporal data, examining patterns such as seasonality, trends, or cyclic behavior that may be characteristic of specific semantic types.
5. Dimensionality reduction: Applying techniques like Principal Component Analysis (PCA) or t-SNE to visualize and analyze high-dimensional relationships between data fields.

These statistical analyses may be used to generate additional features for the classifier, validate prediction results, or inform the confidence score calculations.

By combining advanced machine learning techniques with rigorous validation processes and human-interpretable outputs, the semantic type prediction method (1600) provides a robust foundation for understanding and categorizing complex datasets. This semantic understanding may be used for subsequent data transformation and analysis processes, enabling more accurate and meaningful insights to be derived from the data.

The method's modular design allows for continuous improvement and adaptation to new data types and domains. As new machine learning architectures or validation techniques emerge, they can be incorporated into the existing framework, ensuring that the semantic type prediction process remains state-of-the-art and capable of handling evolving data landscapes.

Privacy Preservation Techniques

Figure 3:
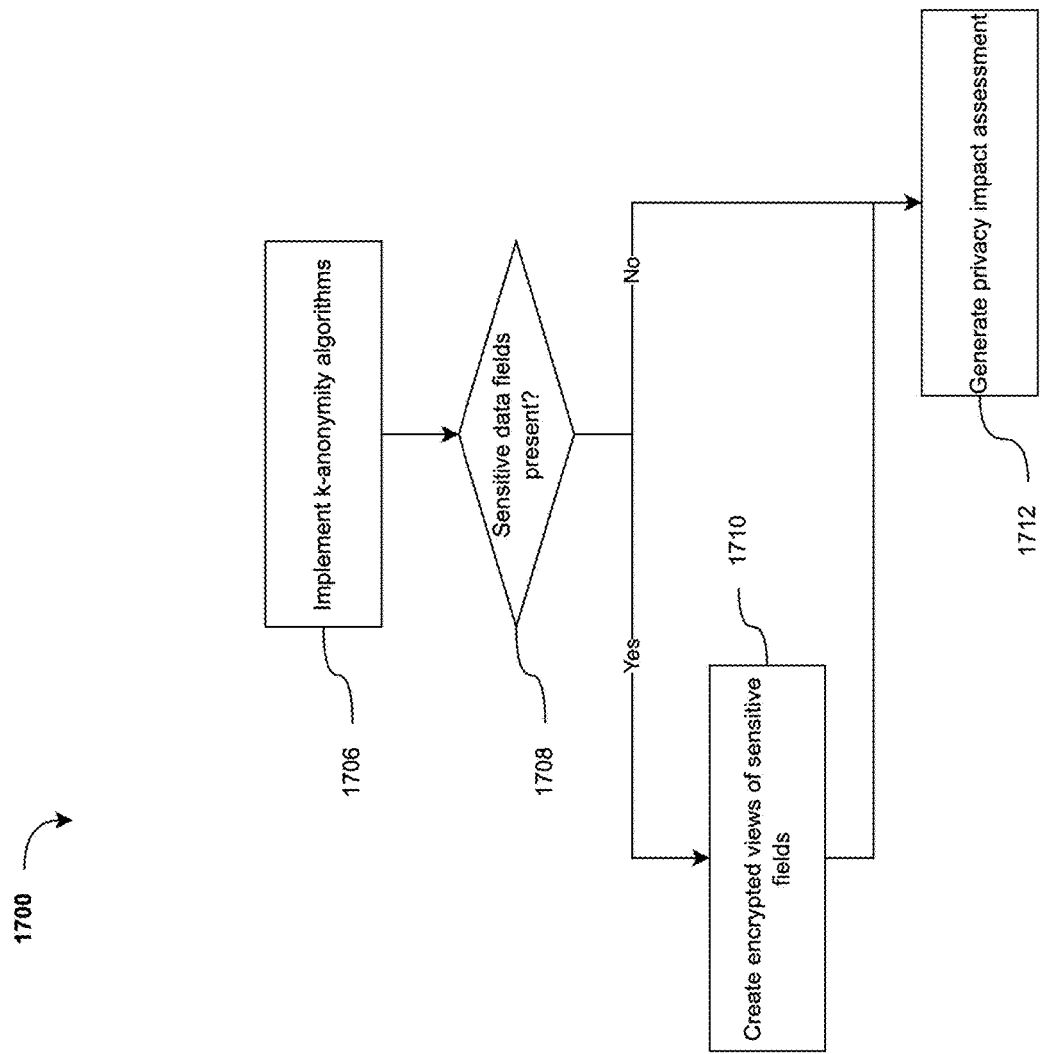
FIG. 3 illustrates a flowchart for a privacy preservation method, in accordance with example embodiments.

FIG. 3 illustrates a flowchart for a privacy preservation method (1700) that represents a comprehensive approach to safeguarding sensitive information within datasets while maintaining data utility for analysis and processing. The method (1700) incorporates multiple layers of privacy-enhancing techniques, each designed to address specific aspects of data protection and anonymization.

The method (1700) then progresses to a step (1706) where k-anonymity algorithms are implemented. K-anonymity is a privacy model that ensures that for any combination of quasi-identifier attributes in the dataset, there are at least k individuals who share the same values. This technique is particularly effective for categorical data fields and helps prevent the identification of individuals based on unique combinations of characteristics.

The implementation of k-anonymity involves a complex process of data generalization and suppression. The system analyzes the dataset to identify quasi-identifiers-attributes that, when combined, could potentially lead to individual identification. It then applies sophisticated algorithms to transform these attributes in a way that ensures the k-anonymity property is satisfied. This may involve techniques such as attribute generalization (e.g., reducing the granularity of age data from specific years to age ranges) or cell suppression (selectively removing or obscuring certain data points).

The value of k in the k-anonymity algorithm may be dynamically adjusted based on the specific privacy requirements of the dataset, regulatory standards, or the sensitivity of the information. Higher k values provide stronger anonymity guarantees but may result in greater information loss. The system may employ optimization algorithms to find the optimal k value that satisfies privacy requirements while minimizing data distortion.

After implementing k-anonymity, the method (1700) reaches a decision step (1708) where the system determines if sensitive data fields are present. This decision-making process involves a comprehensive analysis of the dataset, taking into account the results of the PII identification process, predefined sensitivity criteria, and potentially, machine learning models trained to recognize sensitive information patterns.

The sensitivity determination may consider various factors, including the nature of the data (e.g., health records, financial transactions), the potential for harm if disclosed, and applicable legal and regulatory requirements. The system may employ natural language processing techniques to analyze text fields for sensitive content and utilize contextual analysis to understand the implications of different data combinations.

If sensitive data fields are identified, the method (1700) proceeds to a step (1710) where encrypted views of sensitive fields are created. This step involves the application of advanced cryptographic techniques to protect the underlying sensitive information while preserving data relationships and referential integrity. The encryption process may utilize encryption algorithms with appropriate key lengths, to ensure the confidentiality of the sensitive data.

In some implementations, the system may employ homomorphic encryption techniques, which allow for computations to be performed on encrypted data without decrypting it. This powerful capability enables certain types of data analysis and processing to be conducted on sensitive fields without exposing the actual values, significantly enhancing data privacy while maintaining utility for specific analytical tasks.

The encrypted views may be implemented using various database technologies, such as encrypted columns in relational databases or encrypted documents in NoSQL systems. The encryption keys may be managed through a sophisticated key management system that ensures secure key generation, storage, rotation, and revocation.

Regardless of whether sensitive fields are present, the method (1700) concludes with a step (1712) involving the generation of a comprehensive privacy impact assessment. This assessment quantifies the re-identification risk associated with the dataset after the application of the various privacy preservation techniques. The assessment process involves a multi-faceted analysis that considers numerous factors affecting privacy and re-identification risk.

The privacy impact assessment may employ advanced statistical methods and machine learning algorithms to evaluate the effectiveness of the applied anonymization techniques. This may include simulating various attack scenarios, such as linkage attacks using external data sources, to assess the robustness of the privacy protections. The system may utilize techniques from adversarial machine learning to model potential re-identification attempts and evaluate the dataset's resilience to such attacks.

The assessment considers factors such as the uniqueness of data combinations within the dataset, the strength and appropriateness of the applied anonymization methods, and the potential for inference attacks based on aggregate statistics. It may also take into account the specific context of the data use, including the intended audience, data retention periods, and potential future uses of the data.

The privacy impact assessment generates detailed metrics on the effectiveness of each privacy preservation technique applied. These metrics may include measures such as information loss, data utility preservation, and re-identification risk scores. The assessment may utilize visualization techniques to present complex privacy-related information in an interpretable format, facilitating decision-making by data stewards and privacy officers.

In some cases, the assessment may provide actionable recommendations for further privacy enhancements or data handling practices. These recommendations may be generated using expert systems or machine learning models trained on best practices in data privacy and security. The suggestions may include adjustments to anonymization parameters, additional data transformation steps, or changes to data access and governance policies.

Throughout the privacy preservation process, the system may employ adaptive techniques to optimize the balance between privacy protection and data utility. This may involve the use of reinforcement learning algorithms that continuously refine the privacy preservation strategies based on feedback from data usage patterns and privacy assessments. The system may dynamically adjust parameters such as k-anonymity thresholds, or encryption schemes to maintain optimal privacy-utility trade-offs as the dataset evolves or as analytical requirements change.

In certain implementations, the privacy preservation method (1700) may incorporate advanced cryptographic techniques such as secure multi-party computation or zero-knowledge proofs. Secure multi-party computation allows multiple parties to jointly compute a function over their inputs while keeping those inputs private. This capability enables collaborative data analysis scenarios where sensitive information from multiple sources can be analyzed without any party revealing their raw data to others.

Zero-knowledge proofs, on the other hand, allow one party (the prover) to prove to another party (the verifier) that a statement is true without revealing any information beyond the validity of the statement itself. In the context of privacy preservation, zero-knowledge proofs can be used to verify certain properties of the data or the results of computations without exposing the underlying sensitive information.

These advanced cryptographic techniques may be implemented using cutting-edge protocols and algorithms, such as garbled circuits for secure multi-party computation or zk-SNARKs (Zero-Knowledge Succinct Non-Interactive Arguments of Knowledge) for efficient zero-knowledge proofs. The integration of these techniques into the privacy preservation method allows for sophisticated data analysis and verification processes that maintain a high level of privacy and confidentiality.

By combining multiple privacy preservation techniques, including PII identification, k-anonymity, encryption, and advanced cryptographic methods, the method (1700) offers a flexible and robust approach to protecting sensitive information in diverse datasets. This multi-layered strategy enables organizations to comply with stringent data protection regulations while maximizing the utility of their data for analysis and machine learning applications. The comprehensive privacy impact assessment provides a quantitative basis for evaluating and continuously improving the effectiveness of the privacy preservation measures, ensuring that the method remains adaptive and resilient in the face of evolving privacy challenges and analytical requirements.

Model Architecture Selection and Training

Figure 4:
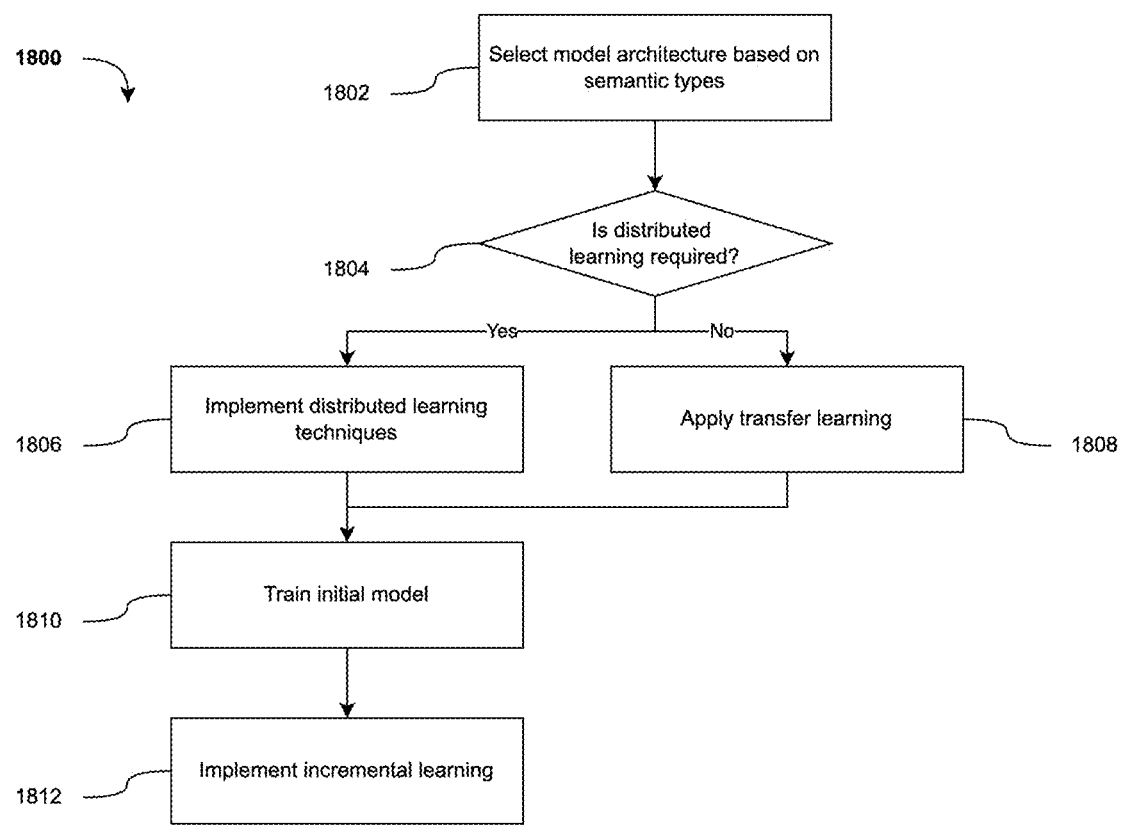
FIG. 4 illustrates a flowchart for a model architecture selection method, according to aspects of the present disclosure.

FIG. 4 illustrates a flowchart for a model architecture selection method (1800) that represents a comprehensive approach to selecting and training machine learning models based on the characteristics of the transformed dataset. This method incorporates advanced techniques for architecture selection, distributed learning, transfer learning, and continuous model refinement, while maintaining a strong focus on privacy preservation and adaptability to diverse data environments.

The method (1800) commences with a step (1802) of selecting model architecture based on semantic types. In this initial phase, the machine learning module conducts a thorough analysis of the semantic types identified in the transformed dataset to determine the most appropriate model architecture. This process involves a sophisticated mapping between data characteristics and model capabilities. For instance, in scenarios where the dataset predominantly contains textual data, the module may opt for architectures specifically designed for natural language processing tasks, such as transformer-based models like BERT (Bidirectional Encoder Representations from Transformers) or GPT (Generative Pre-trained Transformer). These models excel at capturing contextual relationships in text and can be applied to tasks such as sentiment analysis, named entity recognition, or text classification.

Conversely, if the data primarily consists of numerical and time-series information, the module may select architectures optimized for sequential data processing, such as recurrent neural networks (RNNs), long short-term memory (LSTM) networks, or more advanced variants like temporal convolutional networks (TCNs). These architectures are particularly adept at capturing temporal dependencies and patterns in time-series data, making them suitable for applications such as financial forecasting, sensor data analysis, or predictive maintenance.

The architecture selection process may also consider hybrid approaches for datasets with mixed data types. For example, in cases where the dataset contains both textual and numerical features, the module may propose a multimodal architecture that combines convolutional layers for feature extraction from text with recurrent layers for processing numerical sequences. This hybrid approach allows the model to leverage the strengths of different architectural components to effectively process diverse data types within a single framework.

Following the architecture selection, the method (1800) advances to a decision step (1804) where it determines if distributed learning is required. This decision point takes into account various factors that may necessitate a distributed learning approach. These factors may include stringent data privacy requirements, such as those mandated by regulations like the General Data Protection Regulation (GDPR) or the Health Insurance Portability and Accountability Act (HIPAA). Additionally, the decision may be influenced by the inherently distributed nature of the data sources, which may be spread across multiple geographic locations or organizational boundaries.

If the decision step (1804) determines that distributed learning is required, the method (1800) proceeds to a step (1806) where distributed learning techniques are implemented.

The implementation of distributed learning in step (1806) may involve several sophisticated techniques to ensure both model performance and data protection. One such technique is secure aggregation, which allows the central server to compute aggregate model updates from multiple participants without accessing individual contributions. This may be achieved through cryptographic protocols such as homomorphic encryption or secure multi-party computation. Another aspect of distributed learning is the development of communication-efficient algorithms that minimize the amount of information exchanged between the central server and the participating devices. Techniques such as gradient compression, sketching, or quantization may be employed to reduce communication overhead while maintaining model accuracy.

In scenarios where distributed learning is not required, as determined in step (1804), the method (1800) transitions to a step (1808) where transfer learning is applied. Transfer learning leverages knowledge gained from pre-trained models that are relevant to the identified semantic types, allowing for more efficient model development and potentially improved performance on the target task. The selection of an appropriate pre-trained model for transfer learning is a nuanced process that considers factors such as the similarity between the source and target domains, the complexity of the pre-trained model, and the amount of available target data.

For example, in computer vision tasks, pre-trained convolutional neural networks such as ResNet, Inception, or EfficientNet, which have been trained on large-scale image datasets like ImageNet, may serve as powerful feature extractors. These pre-trained models can be fine-tuned on the specific dataset, with the lower layers (which capture general visual features) typically frozen, while the upper layers are adapted to the target task. This approach can significantly reduce training time and improve performance, especially when the target dataset is relatively small.

In natural language processing applications, large language models such as BERT, GPT, or T5 may be used as starting points for transfer learning. These models, pre-trained on vast corpora of text data, capture rich linguistic knowledge that can be leveraged for various downstream tasks. Fine-tuning techniques for these models may include task-specific head adaptation, where a new output layer is added and trained for the target task while the pre-trained layers are fine-tuned with a lower learning rate.

After either the distributed learning step (1806) or the transfer learning step (1808), the method (1800) progresses to a step (1810) where the initial model is trained. This training process involves optimizing the model's parameters using the transformed dataset. The optimization may be carried out using advanced gradient-based techniques such as Adam (Adaptive Moment Estimation) or more recent variants like AdamW, which incorporate weight decay for improved generalization. The training process may also employ techniques to mitigate common challenges in deep learning, such as vanishing or exploding gradients. These techniques may include careful weight initialization strategies, gradient clipping, or the use of activation functions with desirable properties, such as Rectified Linear Units (ReLU) or its variants.

In some implementations of step (1810), techniques such as low-rank adaptation (LoRA) may be employed to fine-tune the model efficiently. LoRA allows for the adaptation of large pre-trained models by training a small number of additional parameters, represented as low-rank matrices. This approach can significantly reduce the computational requirements for fine-tuning while maintaining model performance. The LoRA technique may be particularly beneficial when working with very large language models or in scenarios where computational resources are constrained.

Following the initial training, the method (1800) advances to a step (1812) where incremental learning is implemented. Incremental learning enables the model to continuously refine and update its knowledge based on new data, without the need for complete retraining. This approach is particularly valuable in scenarios where data is continuously streaming or updated over time, such as in online learning systems or real-time analytics platforms.

The implementation of incremental learning in step (1812) may involve sophisticated techniques to balance the retention of previously learned knowledge with the acquisition of new information. One such technique is elastic weight consolidation (EWC), which selectively slows down learning on certain weights to prevent catastrophic forgetting of previously learned tasks. Another approach is gradient episodic memory (GEM), which stores a subset of data from previous tasks and uses it to constrain the optimization on new tasks, ensuring that performance on old tasks does not degrade.

Throughout the model architecture selection and training process, the machine learning module may employ various techniques to balance model performance with privacy preservation. In distributed learning scenarios, secure aggregation protocols may be utilized to combine model updates from multiple participants without revealing individual contributions. These protocols may leverage cryptographic techniques such as threshold homomorphic encryption or secure multi-party computation to ensure that the central server can compute aggregate updates without accessing raw data or individual model parameters.

The model architecture selection method (1800) may also incorporate adaptive techniques to optimize model performance based on the specific characteristics of the dataset and the intended use case. This adaptive approach may involve dynamic adjustment of the model's hyperparameters or architecture based on performance metrics observed during training. For example, the method may employ Bayesian optimization or neural architecture search techniques to explore the hyperparameter space efficiently and identify optimal configurations.

The adaptive optimization process may consider multiple objectives simultaneously, such as model accuracy, inference latency, and memory footprint. This multi-objective optimization may be particularly relevant in scenarios where the model needs to be deployed on resource-constrained devices or in real-time applications. The method may leverage techniques such as Pareto optimization to identify a set of optimal trade-offs between different performance criteria, allowing for flexible model selection based on specific deployment requirements.

In some implementations, the model architecture selection and training process may be executed in a distributed manner, with different components running in the cloud or on client premises. This distributed execution model provides flexibility in balancing computational requirements, data privacy concerns, and regulatory compliance needs. For instance, sensitive data preprocessing and initial model training may occur on client premises, leveraging secure enclaves or trusted execution environments to ensure data confidentiality. Subsequent model refinement and performance evaluation stages may be conducted in a secure cloud environment, taking advantage of scalable computing resources while maintaining strict access controls and encryption measures.

The distributed execution model may also facilitate collaborative learning scenarios where multiple organizations contribute to model development without sharing raw data.

This may be achieved through distributed learning approaches or more advanced techniques such as split learning, where different layers of the neural network are trained on different parties' infrastructure. These collaborative learning approaches may be particularly valuable in domains such as healthcare or finance, where data sharing is often restricted due to privacy regulations or competitive concerns.

By combining advanced model selection techniques with privacy-preserving training approaches and continuous refinement capabilities, the model architecture selection method (1800) provides a robust framework for developing and maintaining machine learning models that are both effective and respectful of data privacy concerns. The method's modular design and adaptive capabilities enable it to address the diverse requirements of modern machine learning applications, from edge computing scenarios to large-scale distributed systems, while maintaining a strong focus on privacy, performance, and adaptability.

Data Processing Architecture

Figure 5:
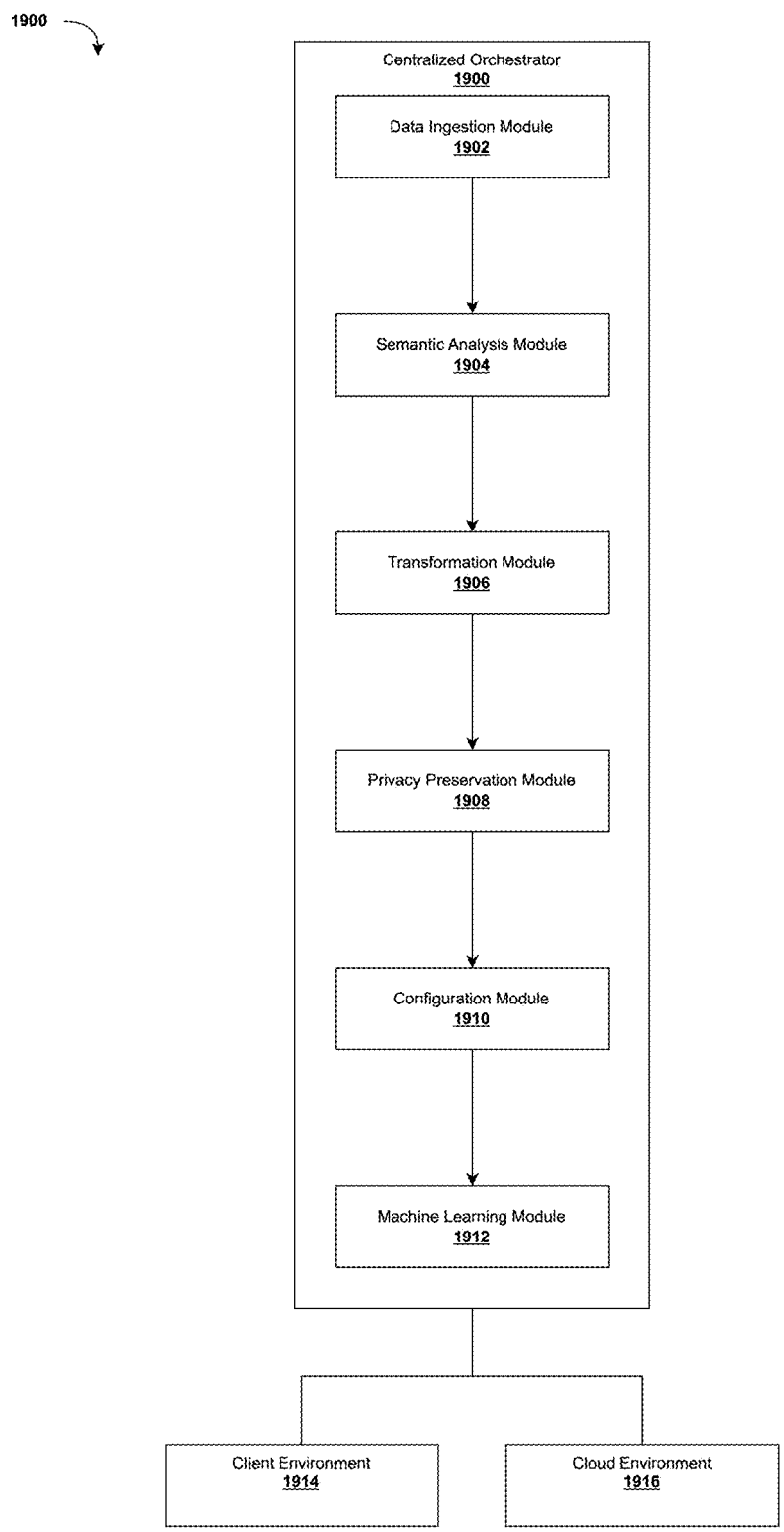
FIG. 5 illustrates a flowchart of a data processing architecture, according to an embodiment.

FIG. 5 illustrates a flowchart of a data processing architecture that incorporates multiple specialized modules coordinated by a centralized orchestrator. This architecture provides a comprehensive framework for automated data processing, transformation, and analysis while maintaining privacy and security measures. The architecture is designed to handle complex data processing tasks with a focus on modularity, scalability, and adaptability to various deployment scenarios.

The architecture can include a centralized orchestrator (1900). The centralized orchestrator (1900) functions as the primary control center, managing and coordinating the activities of various processing modules. The orchestrator may be implemented as a distributed system, utilizing technologies such as Apache ZooKeeper or etcd for distributed coordination and consensus. This approach ensures high availability and fault tolerance, allowing the orchestrator to maintain operational continuity even in the event of partial system failures.

In some implementations, the centralized orchestrator (1900) may employ a microservices architecture, where each major function is encapsulated within its own service. This design allows for independent scaling and updating of individual components, enhancing the system's overall maintainability and resilience. The orchestrator may utilize a combination of synchronous and asynchronous communication patterns to manage the flow of data and control signals throughout the processing pipeline. For synchronous operations that require immediate responses, the orchestrator may employ RESTful APIs or gRPC for efficient, low-latency communication. Asynchronous operations, which may include long-running processes or event-driven workflows, may be handled through message queues or event streaming platforms such as Apache Kafka or RabbitMQ.

The centralized orchestrator (1900) may incorporate a sophisticated state management system to track the progress of data processing tasks across multiple modules. This state management system may utilize distributed caching technologies like Redis or Memcached to maintain a consistent view of the system state across multiple nodes. The state information may include metadata about ongoing processing tasks, resource allocation, and intermediate results, enabling the orchestrator to make informed decisions about task scheduling and resource management.

In some cases, the centralized orchestrator (1900) may utilize atomic agents to perform specific tasks in the data processing pipeline. These atomic agents may be implemented as containerized microservices, allowing for easy deployment and scaling across different computing environments. The atomic agents may be specialized components designed to handle discrete operations efficiently, such as data validation, format conversion, or specific analytical tasks. By leveraging containerization technologies like Docker and orchestration platforms like Kubernetes, the system can dynamically allocate and manage these atomic agents based on workload demands and resource availability.

Connected to the centralized orchestrator (1900) is a data ingestion module (1902). The data ingestion module (1902) serves as the initial entry point for data processing, responsible for acquiring and preparing raw data for further analysis. This module may support a wide range of data ingestion methods, including batch processing, real-time streaming, and incremental updates. For batch processing, the module may utilize technologies such as Apache Hadoop or Apache Spark to efficiently handle large volumes of data. Real-time data ingestion may be facilitated through stream processing frameworks like Apache Flink or Apache Storm, enabling low-latency processing of continuous data streams.

The data ingestion module (1902) may incorporate advanced data quality checks and validation mechanisms to ensure the integrity and consistency of incoming data. These checks may include schema validation, data type verification, and custom business rule enforcement. The module may also implement data deduplication techniques to eliminate redundant information and optimize storage utilization. In scenarios where data arrives from multiple sources or in various formats, the ingestion module may employ adaptive parsing algorithms and schema inference techniques to automatically detect and adapt to different data structures.

Following data ingestion, the architecture includes a semantic analysis module (1904). The semantic analysis module (1904) is responsible for analyzing the ingested data to determine semantic types and structures. This module may employ advanced machine learning techniques, such as transformer-based classifiers, to predict and validate semantic types within the dataset. The semantic analysis process may involve multiple stages, including tokenization, entity recognition, and relationship extraction.

The semantic analysis module (1904) may utilize pre-trained language models such as BERT (Bidirectional Encoder Representations from Transformers) or GPT (Generative Pre-trained Transformer) as a foundation for understanding the contextual relationships within the data. These models may be fine-tuned on domain-specific datasets to enhance their accuracy for particular industries or data contexts. The module may also incorporate external knowledge bases or ontologies to enrich the semantic understanding of the data, potentially leveraging technologies like knowledge graphs to represent complex relationships between entities.

The architecture then incorporates a transformation module (1906). The transformation module (1906) generates data transformation instructions based on the determined semantic types. These instructions may include SQL-based queries, data normalization steps, and quality validation rules to ensure consistency in the transformed data. The transformation process may involve complex operations such as data aggregation, dimensionality reduction, or feature engineering, depending on the specific requirements of the downstream analysis tasks.

The transformation module (1906) may employ a domain-specific language (DSL) for defining transformation rules, allowing for flexible and expressive data manipulation operations. This DSL may be compiled into optimized execution plans, potentially leveraging query optimization techniques similar to those used in database management systems. The module may also implement versioning and lineage tracking for transformation rules, enabling reproducibility and facilitating audit trails for regulatory compliance.

To address privacy concerns, the architecture includes a privacy preservation module (1908). The privacy preservation module (1908) is responsible for identifying and obfuscating potential personally identifiable information (PII) in the dataset. This module may employ a multi-layered approach to privacy protection, combining techniques such as k-anonymity and encryption to protect sensitive data while maintaining its utility for analysis.

The privacy preservation module (1908) may utilize advanced machine learning models for PII detection, including named entity recognition (NER) systems trained on diverse datasets to identify various types of sensitive information. The module may implement adaptive privacy-preserving techniques that dynamically adjust the level of protection based on the sensitivity of the data and the specific requirements of the analysis task. This may involve the use of privacy-preserving synthetic data generation techniques, such as generative adversarial networks (GANs), to create realistic but anonymized datasets for certain analytical purposes.

The architecture also features a configuration module (1910). The configuration module (1910) determines data storage configurations for the transformed dataset. These configurations may specify how and where processed data should be stored, taking into account factors such as data sensitivity, access patterns, and regulatory requirements. The configuration module may implement a policy-based approach to data management, allowing organizations to define and enforce data governance rules across the entire data lifecycle.

The configuration module (1910) may utilize advanced data cataloging and metadata management systems to maintain a comprehensive inventory of datasets, their attributes, and associated access controls. This catalog may be integrated with data lineage tracking mechanisms, providing a complete view of data transformations and dependencies throughout the processing pipeline. The module may also implement intelligent data tiering strategies, automatically moving data between different storage tiers (e.g., hot, warm, cold storage) based on access patterns and retention policies.

At the end of the processing chain, the architecture includes a machine learning module (1912). The machine learning module (1912) is responsible for generating and training models based on the processed data. This module may employ a wide range of machine learning techniques, including supervised, unsupervised, and reinforcement learning approaches, depending on the specific requirements of the dataset and use case. The module may implement automated machine learning (AutoML) capabilities, utilizing techniques such as neural architecture search (NAS) and hyperparameter optimization to automatically select and configure appropriate model architectures.

The machine learning module (1912) may incorporate distributed learning capabilities, allowing for collaborative model training across distributed datasets without centralizing sensitive data. This approach may be particularly valuable in scenarios where data privacy regulations or organizational boundaries prevent the consolidation of raw data. The module may also implement transfer learning techniques, leveraging pre-trained models as a starting point for specific tasks and fine-tuning them on domain-specific datasets to improve performance and reduce training time.

The architecture illustrates the flexibility of deployment options by branching to both a client environment (1914) and a cloud environment (1916). This dual-environment approach allows for adaptable deployment strategies based on specific data residency, security, or computational requirements. The system may implement a hybrid cloud architecture, seamlessly integrating on-premises infrastructure with cloud-based resources to optimize performance, cost, and compliance.

In the client environment (1914), the architecture may leverage edge computing technologies to perform certain processing tasks closer to the data source. This approach can reduce latency, minimize data transfer costs, and address data sovereignty concerns. The client environment may utilize containerization and orchestration technologies to ensure consistent deployment and management of processing components across diverse hardware configurations.

The cloud environment (1916) may leverage cloud-native services and serverless computing paradigms to provide scalable and cost-effective processing capabilities. This environment may utilize auto-scaling mechanisms to dynamically adjust computational resources based on workload demands. The cloud deployment may also take advantage of specialized hardware accelerators, such as GPUs or TPUs, for computationally intensive machine learning tasks.

The data processing pipeline implemented within this architecture may generate a directed acyclic graph (DAG) representation of the transformation steps. This DAG representation provides a clear visualization of data dependencies and processing sequences, enabling efficient scheduling and parallelization of tasks. The pipeline may employ advanced graph optimization techniques to identify opportunities for task merging or reordering, potentially improving overall processing efficiency.

To ensure the resilience and reliability of the data processing pipeline, checkpointing mechanisms may be implemented. These mechanisms allow the pipeline to recover from failures or interruptions by saving intermediate states at key points in the processing sequence. The checkpointing system may utilize distributed storage solutions, such as distributed file systems or object stores, to provide fault-tolerant and scalable state persistence.

The centralized orchestrator (1900) may employ a multisignature scheme to encrypt and decrypt state between agents. This approach enhances security by requiring multiple authorized signatures to access or modify critical system states. The multisignature scheme may be implemented using threshold cryptography techniques, where a minimum number of authorized parties must collaborate to perform sensitive operations. This mechanism provides an additional layer of protection against unauthorized access or malicious insider threats.

To handle varying workloads, the data processing pipeline may dynamically scale pipeline resources based on data volume. This scalability allows the system to efficiently process datasets of different sizes while optimizing resource utilization. The scaling mechanism may employ predictive analytics to anticipate workload changes and proactively adjust resources, minimizing processing latency and maximizing cost-efficiency.

The data processing pipeline may also implement secure communication channels between pipeline components. These secure channels may use encryption protocols and authentication mechanisms to protect data as it moves between different modules and environments. The system may employ mutual TLS (Transport Layer Security) for authentication and encryption, ensuring that all inter-component communications are protected against eavesdropping and man-in-the-middle attacks. Additionally, the pipeline may implement fine-grained access controls and audit logging to track all data access and modifications throughout the processing workflow.

By integrating these various modules and features, the data processing architecture illustrated in FIG. 5 provides a comprehensive and flexible framework for handling complex data processing tasks while maintaining security, privacy, and efficiency throughout the pipeline. The architecture's modular design and emphasis on adaptability enable it to address diverse data processing requirements across various industries and use cases, from financial analytics to healthcare research, while adhering to stringent regulatory and privacy standards.

Data Processing Pipeline

Figure 6:
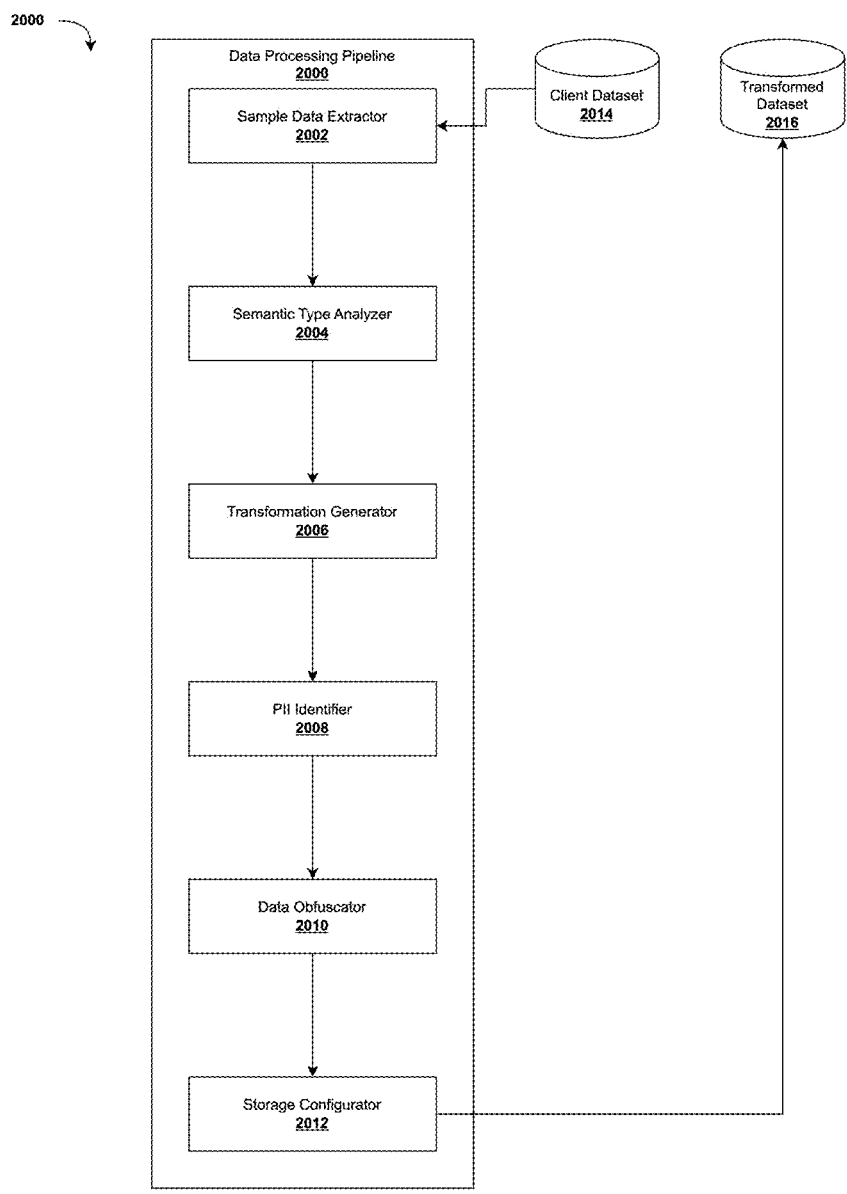
FIG. 6 illustrates a flowchart of a data processing pipeline, in accordance with example embodiments.

FIG. 6 illustrates a flowchart of a data processing pipeline (2000) that represents a comprehensive approach to automated data processing and transformation. The data processing pipeline (2000) comprises multiple specialized modules arranged in a sequential flow, each designed to perform specific functions in the data processing and privacy preservation process. This pipeline architecture enables efficient and systematic handling of complex data processing tasks while maintaining data quality, privacy, and operational efficiency throughout the transformation process.

The data processing pipeline (2000) initiates with a sample data extractor (2002) that receives input from a client dataset (2014). The sample data extractor (2002) is engineered to intelligently select representative data samples from the client dataset (2014). This module employs sophisticated statistical sampling techniques to ensure that the extracted data accurately represents the overall characteristics of the client dataset (2014). The sampling process may utilize stratified sampling methods to account for data distribution across different subgroups within the dataset. Additionally, the sample data extractor (2002) may implement adaptive sampling algorithms that adjust the sampling rate based on the complexity and variability of the data, ensuring optimal representation while minimizing computational overhead.

Connected to the sample data extractor (2002) is a semantic type analyzer (2004). This module is responsible for analyzing the extracted sample data to determine the semantic types of various data fields. The semantic type analyzer (2004) employs advanced machine learning techniques, such as transformer-based classifiers, to predict and validate semantic types within the dataset. These classifiers may be pre-trained on diverse datasets and fine-tuned for specific domain contexts to enhance accuracy. The semantic analysis process may involve multiple stages, including tokenization, contextual embedding, and multi-head attention mechanisms to capture complex relationships between data fields. The analyzer may also incorporate external knowledge bases and ontologies to enrich its understanding of domain-specific semantic types.

Following the semantic type analyzer (2004), the data processing pipeline (2000) incorporates a transformation generator (2006). This module is tasked with creating data transformation instructions based on the semantic types identified by the semantic type analyzer (2004). The transformation generator (2006) may employ a sophisticated rule engine that combines predefined transformation templates with dynamically generated rules based on the specific characteristics of the dataset. In many implementations, the transformation generator (2006) produces SQL-based transformation queries to standardize data formats across the dataset. These SQL queries are optimized for distributed execution, leveraging techniques such as query rewriting, predicate pushdown, and partition pruning to enable efficient processing of large-scale datasets across distributed computing environments.

The transformation generator (2006) extends its functionality beyond query generation by creating comprehensive data quality validation rules. These rules are meticulously designed to identify and flag anomalies, inconsistencies, or errors in the data that could potentially impact the quality of subsequent analysis or machine learning models. The validation rules may encompass a wide range of checks, including format validation, range checks, cross-field validations, and complex business logic implementations. To enhance adaptability, the rule generation process may incorporate machine learning algorithms that learn from historical data patterns and user feedback to continuously refine and expand the validation ruleset.

In certain implementations, the transformation generator (2006) is equipped with capabilities to automatically generate detailed documentation of the transformation logic. This auto-documentation feature produces comprehensive metadata that describes each transformation step, including the rationale behind specific transformations, the impact on data structure and semantics, and any assumptions or constraints applied during the process. The generated documentation serves as a clear audit trail of the data transformations applied, significantly enhancing transparency and facilitating future maintenance or modifications of the data processing pipeline (2000). This documentation may be stored in machine-readable formats, enabling automated dependency analysis and impact assessments for proposed changes to the pipeline.

The data processing pipeline (2000) then progresses to a PII identifier (2008) module. This component is engineered to detect potential personally identifiable information (PII) within the dataset. The PII identifier (2008) employs a multi-faceted approach to PII detection, combining advanced pattern recognition techniques, contextual analysis, and machine learning models. These methods enable the identification of various types of PII, even in unstructured or semi-structured data formats. The module may utilize named entity recognition models and semantic similarity measures to identify both explicit and implicit PII. Additionally, the PII identifier (2008) may implement adaptive learning mechanisms that allow it to recognize novel PII patterns based on evolving data characteristics and regulatory requirements.

Connected to the PII identifier (2008) is a data obfuscator (2010). This module applies various privacy-preserving techniques to the identified PII. The data obfuscator (2010) implements a range of methods, including k-anonymity algorithms, and advanced encryption methods. These techniques are carefully calibrated to protect sensitive information while maintaining the overall utility of the dataset for analysis and machine learning purposes. The module may employ adaptive privacy-preserving strategies that dynamically adjust the level of obfuscation based on the sensitivity of the data, the intended use case, and applicable privacy regulations. In some implementations, the data obfuscator (2010) may utilize homomorphic encryption techniques, allowing certain computations to be performed on encrypted data without compromising privacy.

The final component in the data processing pipeline (2000) is a storage configurator (2012). This module is responsible for determining optimal data storage configurations for the transformed and privacy-preserved dataset. The storage configurator (2012) employs a sophisticated decision-making process that considers multiple factors such as data access patterns, query performance requirements, scalability needs, and regulatory compliance mandates. The module may utilize machine learning algorithms to analyze historical access patterns and predict future data usage trends, informing decisions on data partitioning, indexing strategies, and storage medium selection. The storage configurator (2012) may also implement policy-based storage management, automatically applying appropriate retention policies, access controls, and encryption settings based on the classified data types and sensitivity levels.

The output of the data processing pipeline (2000) is a transformed dataset (2016). This transformed dataset (2016) may, in some embodiments, incorporate one or more of the standardizations, privacy preservations, and optimizations applied throughout the pipeline. The resulting dataset is structured to facilitate efficient querying, analysis, and machine learning applications while maintaining strict privacy and security standards.

To enhance its functionality and flexibility, the data processing pipeline (2000) may incorporate additional specialized components. One such component is a filesystem agent designed for intelligent document retrieval and context-aware question answering. This agent leverages natural language processing and information retrieval techniques to enable sophisticated data exploration and analysis capabilities within the pipeline. The filesystem agent may implement vector space models or transformer-based architectures to understand the semantic content of documents and respond to complex queries with high accuracy and contextual relevance.

The data processing pipeline (2000) may also integrate a visualization agent that interfaces with data visualization tools such as Apache Superset. This visualization agent facilitates the creation of interactive and dynamic data visualizations, allowing users to gain deeper insights from the transformed dataset (2016). The agent may employ advanced data summarization techniques and automated chart selection algorithms to suggest appropriate visualization types based on the characteristics of the data and the nature of the analysis being performed.

In certain implementations, the data processing pipeline (2000) incorporates a bloom filter to create a trust-minimized onchain representation of events. This probabilistic data structure enables efficient verification of data inclusion without revealing sensitive information, thereby enhancing the privacy and security aspects of the pipeline. The bloom filter implementation may utilize multiple hash functions and bit array manipulations to achieve a compact representation of large datasets, allowing for rapid membership queries with tunable false-positive rates.

The transformation generator (2006) may be augmented with a SQL generation agent capable of converting natural language queries into SQL queries. This feature significantly enhances the usability of the data processing pipeline (2000) by allowing users to interact with the data using natural language commands. The SQL generation agent employs sophisticated natural language understanding models, potentially leveraging large language models fine-tuned on SQL generation tasks. These models parse the user's intent, identify relevant entities and relationships within the data schema, and generate syntactically correct and semantically appropriate SQL queries for execution. The agent may also implement query optimization techniques to ensure that the generated SQL is efficient and adheres to best practices for database performance.

By integrating these various components and features, the data processing pipeline (2000) illustrated in FIG. 6 provides a comprehensive framework for handling complex data processing tasks. The sequential flow from initial data extraction through semantic analysis, transformation, PII handling, and obfuscation, to final storage configuration ensures a systematic and thorough approach to data processing and privacy preservation. This architecture enables organizations to efficiently process and analyze large volumes of data while maintaining strict controls over data quality, privacy, and security, thereby facilitating compliance with regulatory requirements and enabling advanced analytics and machine learning applications across diverse domains.

Dataset Processing Method

Figure 7:
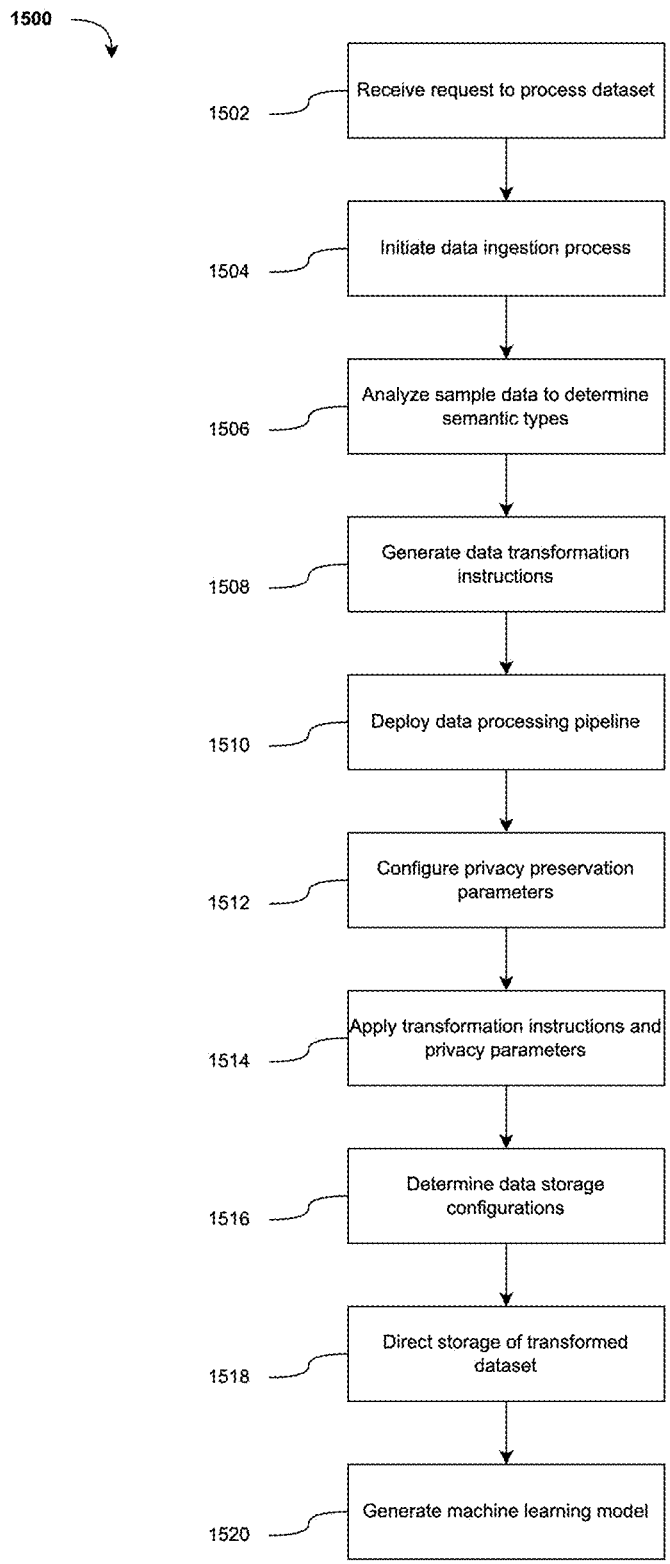
FIG. 7 illustrates a flowchart for a dataset processing method, according to aspects of the present disclosure.

FIG. 7 illustrates a flowchart for a dataset processing method (1500) that represents a comprehensive and sophisticated approach to automated data processing and transformation. This method incorporates advanced privacy preservation techniques and machine learning model generation capabilities, providing a robust framework for handling complex data processing tasks across diverse industries and regulatory environments.

The method (1500) commences with a step (1502) of receiving a request to process a dataset associated with a client. This initial step serves as the entry point for the data processing workflow and may trigger a cascade of orchestrated actions that guide the dataset through various processing stages. The request reception mechanism may be implemented using a variety of protocols and interfaces, such as RESTful APIs, gRPC, or message queues, allowing for flexible integration with different client systems and architectures. The request payload may contain metadata about the dataset, processing requirements, and any specific constraints or preferences that need to be considered during the processing pipeline.

Following the receipt of the processing request, the method (1500) advances to a step (1504) where a data ingestion process is initiated. This step demonstrates the method's adaptability to different operational environments and client requirements. In some implementations, the data ingestion process may be executed on client premises, leveraging edge computing technologies or on-site data processing infrastructure. This approach may be particularly suitable for scenarios where data sovereignty, regulatory compliance, or network bandwidth limitations necessitate local processing. Alternatively, the ingestion process may occur in a cloud environment, utilizing scalable cloud-native services for data intake and initial processing. The choice between on-premises and cloud-based ingestion may depend on factors such as data volume, processing requirements, latency considerations, and the client's existing IT infrastructure.

The data ingestion process may employ various techniques to efficiently handle large volumes of data and diverse data formats. These techniques may include parallel processing, data streaming, and incremental updates. The ingestion module may implement adaptive parsing algorithms and schema inference mechanisms to automatically detect and adapt to different data structures, enabling seamless processing of structured, semi-structured, and unstructured data sources. Additionally, the ingestion process may incorporate data quality checks and validation mechanisms to ensure the integrity and consistency of the incoming data, flagging or rectifying any anomalies or inconsistencies at the earliest stage of the processing pipeline.

The method (1500) then progresses to a step (1506) where sample data is analyzed to determine semantic types. This analysis forms the foundation for subsequent data transformation and processing steps, enabling the system to develop a nuanced understanding of the structure and meaning of the data it is handling. The semantic analysis process may employ advanced machine learning techniques, such as transformer-based models or deep learning networks, to automatically classify data fields and infer their semantic meanings. These models may be pre-trained on diverse datasets and fine-tuned for specific domain contexts to enhance accuracy and efficiency.

The semantic analysis step may involve multiple stages, including tokenization, entity recognition, relationship extraction, and contextual analysis. The system may leverage external knowledge bases or ontologies to enrich its semantic understanding of the data, potentially utilizing technologies like knowledge graphs to represent complex relationships between entities. The output of this step may include a comprehensive semantic model of the dataset, detailing the types, relationships, and potential uses of each data field.

Based on the semantic analysis, the method (1500) transitions to a step (1508) where data transformation instructions are generated. These instructions are meticulously tailored to the specific characteristics of the dataset, as identified in the previous step. The transformation instruction generation process may involve sophisticated decision-making algorithms that consider factors such as data quality, consistency requirements, target schema specifications, and performance optimizations. The generated instructions may be represented in a domain-specific language (DSL) or as a series of abstract syntax trees (ASTs) that can be efficiently parsed and executed by the data processing pipeline.

In some implementations, the transformation instruction generation step may leverage historical data and machine learning models to suggest optimal transformation strategies based on past successes with similar datasets. This approach allows the system to continuously learn and improve its transformation recommendations over time, adapting to evolving data patterns and processing requirements.

The method (1500) then advances to a step (1510) where a data processing pipeline is deployed. This pipeline is typically deployed to a client-controlled environment, where it is executed within the client premises. This approach allows for greater control and security of sensitive data processing operations, addressing concerns related to data privacy and regulatory compliance. The deployment process may utilize container orchestration technologies such as Kubernetes or Docker Swarm to ensure consistent and reproducible pipeline execution across different environments.

The deployed data processing pipeline may be composed of modular, reusable components that can be dynamically assembled based on the specific requirements of each dataset. These components may include data cleaners, transformers, validators, and enrichment modules. The pipeline architecture may support both batch and stream processing paradigms, allowing for flexible handling of different data velocities and volumes. Advanced features such as data sharding, pipelining, and adaptive query optimization may be employed to enhance performance and scalability.

Following the pipeline deployment, the method (1500) proceeds to a step (1512) where privacy preservation parameters are configured. These parameters can be used for identifying and protecting potentially sensitive information within the dataset. The privacy preservation configuration may involve a multi-layered approach, combining techniques such as data masking, tokenization, and encryption. The specific combination and parameterization of these techniques may be determined based on the sensitivity of the data, regulatory requirements, and the intended use of the processed dataset.

The privacy preservation module may employ advanced machine learning models for PII detection, including named entity recognition (NER) systems trained on diverse datasets to identify various types of sensitive information. In some implementations, the system may utilize adaptive privacy-preserving techniques that dynamically adjust the level of protection based on real-time risk assessments, continuously monitoring data patterns and potential re-identification risks.

After configuring the privacy parameters, the method (1500) advances to a step (1514) where the data processing pipeline applies the data transformation instructions and privacy preservation parameters to the dataset. This step represents the a part of processing phase where the actual data transformation and privacy protection measures are implemented. The processing may be distributed across multiple nodes for parallel execution, with careful orchestration to ensure data consistency and integrity throughout the transformation process.

The method (1500) then moves to a step (1516) where data storage configurations are determined. These configurations dictate how and where the processed data can be stored. The storage configuration process may consider factors such as data access patterns, query performance requirements, data lifecycle management, and compliance with data retention policies. Advanced data cataloging and metadata management systems may be employed to maintain a comprehensive inventory of datasets, their attributes, and associated access controls.

Following the determination of storage configurations, the method (1500) proceeds to a step (1518) where storage of the transformed dataset is directed. The storage may occur in a client-controlled environment or a cloud environment, depending on factors such as data sensitivity, regulatory requirements, or client preferences. The storage process may involve data partitioning, indexing, and the creation of appropriate access control mechanisms to ensure secure and efficient data retrieval. In cloud storage scenarios, the system may leverage cloud-native storage services, potentially across multiple cloud providers for enhanced reliability and data sovereignty compliance.

The method (1500) concludes with a step (1520) where a machine learning model is generated based on the processed data. This model generation process may involve automated feature engineering, model selection, and hyperparameter tuning. The system may employ techniques such as AutoML, transfer learning, and ensemble methods to create robust and accurate models. In some implementations, the model generation process may be iterative, with continuous evaluation and refinement based on new data and feedback loops.

Throughout the dataset processing method (1500), various advanced techniques are employed to enhance data management, privacy, and utility. One such technique is the tracking of data lineage throughout the transformation process using a directed acyclic graph (DAG) representation with cryptographic hashes at each step. This approach provides a comprehensive audit trail of data transformations, enhancing transparency and facilitating compliance with data governance requirements. The DAG representation allows for detailed tracking of how each data element is transformed, combined, or derived throughout the processing pipeline, enabling precise reconstruction of the data processing journey and facilitating root cause analysis in case of issues.

To optimize query performance on the transformed dataset, the method (1500) may implement automated indexing based on identified access patterns. This optimization process involves analyzing common query types and creating appropriate indexes to improve retrieval speed and efficiency. The system may employ machine learning algorithms to predict future query patterns and proactively create or modify indexes to maintain optimal performance over time. Additionally, the method may implement query result caching mechanisms and materialized views to further enhance query response times for frequently accessed data subsets.

The method (1500) also includes functionality for scheduling recurring data processing jobs based on configurable parameters. This feature allows for automated, periodic updates to the transformed dataset and associated machine learning models, ensuring that insights derived from the data remain current and relevant. The scheduling mechanism may utilize advanced time-series analysis and forecasting techniques to determine optimal processing intervals based on data update frequencies, resource availability, and business requirements.

To facilitate integration with other systems and workflows, the method (1500) provides programmatic access to the orchestrated functionalities through APIs. These APIs allow external applications to initiate data processing tasks, retrieve transformation results, or interact with generated machine learning models. The API layer may be designed with extensibility in mind, potentially utilizing API gateway technologies to manage access control, rate limiting, and versioning. Comprehensive API documentation and software development kits (SDKs) in multiple programming languages may be provided to facilitate easy integration with client systems.

Security and access control can be considerations in the dataset processing method (1500). The method implements access controls for the transformed dataset and machine learning models through role-based permission systems with cryptographic verification. This approach ensures that only authorized users or systems can access sensitive data or model outputs, with cryptographic mechanisms providing strong authentication and integrity guarantees. The access control system may utilize advanced techniques such as attribute-based access control (ABAC) or policy-based access control (PBAC) to provide fine-grained and context-aware access management.

By incorporating these advanced features and techniques, the dataset processing method (1500) provides a comprehensive framework for handling complex data processing tasks while maintaining privacy, security, and efficiency throughout the workflow. The method's flexibility in adapting to different execution environments and its integration of privacy preservation techniques make it suitable for a wide range of data processing scenarios across various industries and regulatory contexts. This versatility, combined with its focus on automation, scalability, and data governance, positions the method as a robust solution for organizations seeking to derive value from their data assets while adhering to stringent privacy and compliance requirements.

Client Computing Architecture

Figure 8:
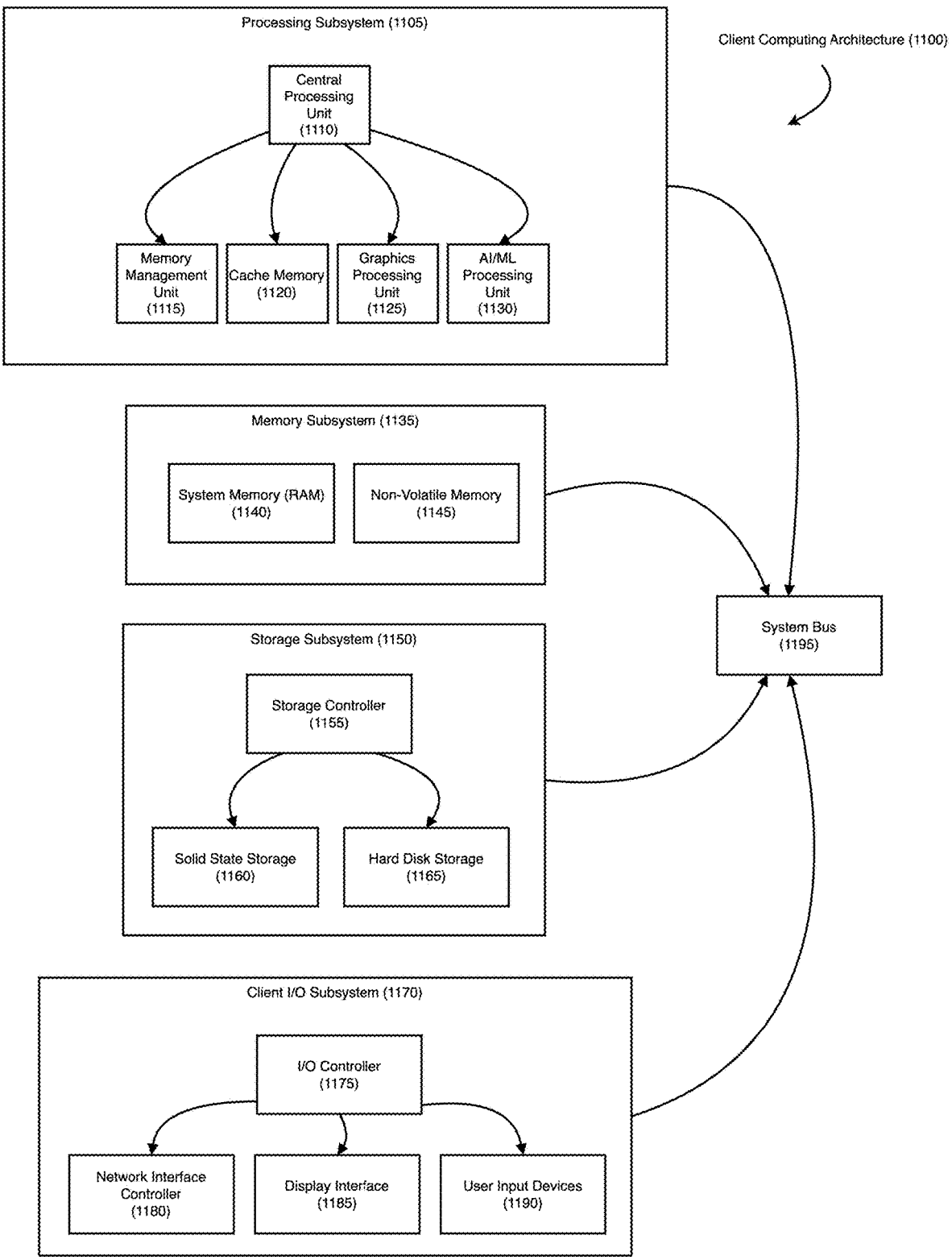
FIG. 8 illustrates a client computing architecture, according to an embodiment.

FIG. 8 illustrates a client computing architecture (1100) that encompasses a sophisticated array of interconnected subsystems, each designed to provide comprehensive computing capabilities. The client computing architecture (1100) exhibits a high degree of versatility, allowing for implementation across a diverse range of devices including, but not limited to, personal computers, laptops, tablets, and specialized computing equipment. The specific configuration of the architecture may be tailored to meet the requirements of the intended application, ensuring optimal performance and functionality.

As a part of the client computing architecture (1100) is the processing subsystem (1105), which serves as the primary computational engine. This subsystem is responsible for executing instructions and performing complex calculations that form the basis of various computing operations. The processing subsystem (1105) may incorporate a central processing unit (1110), which functions as the main processor, orchestrating the execution of general-purpose instructions and coordinating the activities of other components within the architecture.

Intricately connected to the central processing unit (1110) within the processing subsystem (1105) is the memory management unit (1115). This component plays a role in optimizing the utilization of memory resources throughout the system. The memory management unit (1115) is tasked with the dynamic allocation and deallocation of memory, ensuring efficient distribution of resources to various processes and applications. Additionally, it handles memory protection mechanisms, safeguarding against unauthorized access and maintaining the integrity of data stored in memory. The implementation of virtual memory operations falls within the purview of the memory management unit (1115), allowing for the extension of available memory beyond physical limitations. In certain configurations, the memory management unit (1115) may operate in close conjunction with the central processing unit (1110) to further optimize memory usage patterns and enhance overall data access efficiency.

The processing subsystem (1105) is further augmented by the inclusion of cache memory (1120). This high-speed buffer serves as an intermediary between the central processing unit (1110) and the main system memory, significantly reducing access times and improving overall system performance. The cache memory (1120) stores frequently accessed data and instructions, allowing for rapid retrieval by the central processing unit (1110). In more advanced implementations, the cache memory (1120) may be organized into multiple hierarchical levels, each offering different capacities and access speeds. This multi-level cache structure allows for optimized data storage and retrieval based on usage patterns and criticality of information.

To address the demands of graphics-intensive applications, the processing subsystem (1105) may incorporate a dedicated graphics processing unit (1125). This specialized component is engineered to excel in rendering complex images, videos, and three-dimensional graphics. By offloading these computationally intensive tasks from the central processing unit (1110), the graphics processing unit (1125) enables smoother visual experiences and improved overall system performance. The architecture of the graphics processing unit (1125) is optimized for parallel processing, allowing it to handle multiple graphical computations simultaneously. This parallel processing capability may also be leveraged for general-purpose computing tasks that can benefit from its architecture, extending its utility beyond purely graphical applications.

The processing subsystem (1105) may also include an AI/ML processing unit (1130). This specialized hardware component is designed to accelerate workloads specific to artificial intelligence and machine learning applications. The AI/ML processing unit (1130) provides optimized support for tasks such as neural network inference and training, significantly enhancing the performance of AI and ML algorithms. In sophisticated implementations, the AI/ML processing unit (1130) may work in concert with the central processing unit (1110) and the graphics processing unit (1125), creating a synergistic processing environment that maximizes performance for AI and ML applications.

Complementing the processing subsystem (1105) is the memory subsystem (1135), which serves as the primary storage facility for data and instructions utilized by the various components of the client computing architecture (1100). Within this subsystem, the system memory (RAM) (1140) functions as the main working memory, providing fast, volatile storage for active programs and data. The system memory (RAM) (1140) is characterized by its high-speed access capabilities, allowing for rapid read and write operations essential for smooth system operation.

In addition to the volatile system memory (RAM) (1140), the memory subsystem (1135) incorporates non-volatile memory (1145). This component retains data integrity even when power is removed from the system, making it ideal for storing information such as firmware, boot instructions, and other persistent data. The non-volatile memory (1145) may utilize various technologies, including but not limited to flash memory or other advanced solid-state storage solutions, each offering specific advantages in terms of data retention, access speed, and power consumption.

For more extensive data storage requirements, the client computing architecture (1100) integrates a storage subsystem (1150). This subsystem provides higher-capacity, non-volatile storage solutions to complement the faster but more limited memory subsystem (1135). Central to the storage subsystem (1150) is the storage controller (1155), which manages the complex data transfer operations between the various storage devices and other components of the system. The storage controller (1155) optimizes data flow, implements caching strategies, and ensures data integrity during read and write operations.

Within the storage subsystem (1150), solid state storage (1160) may be employed to offer superior read and write speeds, low power consumption, and high reliability. In many configurations, the solid state storage (1160) serves as the primary storage medium for the operating system and frequently accessed applications, leveraging its speed to enhance overall system responsiveness. The absence of moving parts in solid state storage contributes to its durability and resistance to physical shocks, making it particularly suitable for portable devices.

Complementing the solid state storage (1160), the storage subsystem (1150) may also incorporate hard disk storage (1165). This technology offers higher storage capacities at a lower cost per gigabyte compared to solid state solutions. Hard disk storage (1165) is often utilized for storing large files, system backups, or data that is accessed less frequently. The mechanical nature of hard disk storage allows for cost-effective storage of vast amounts of data, making it a valuable component in scenarios where storage capacity takes precedence over access speed.

To facilitate interaction with external devices and networks, the client computing architecture (1100) incorporates a client I/O subsystem (1170). This subsystem is responsible for managing a diverse array of input and output interfaces, ensuring seamless communication between the client computing architecture and the external world. At the heart of the client I/O subsystem (1170) is the I/O controller (1175), which coordinates the complex data transfer operations between external devices and the internal components of the client computing architecture (1100).

Within the client I/O subsystem (1170), the network interface controller (1180) plays a crucial role in enabling communication with various network types, including local area networks, wide area networks, and the internet. This component supports a wide range of networking protocols and standards, ensuring compatibility with diverse network environments. Advanced implementations of the network interface controller (1180) may include both wired and wireless connectivity options, providing flexibility in network access methods.

Visual output capabilities are addressed by the inclusion of a display interface (1185) within the client I/O subsystem (1170). This interface manages the intricate communication between the graphics processing unit (1125) and one or more display devices, which may include monitors, projectors, or integrated screens. The display interface (1185) may support multiple display outputs, accommodating various display resolutions and refresh rates to meet diverse visual requirements.

User interaction with the client computing architecture (1100) is facilitated through user input devices (1190), which are also integrated into the client I/O subsystem (1170). These input devices may encompass a wide range of peripherals, including keyboards, mice, touchpads, and touchscreens, each designed to provide intuitive methods of user interaction. In more specialized configurations, the user input devices (1190) may extend to include advanced input hardware such as game controllers, drawing tablets, or biometric sensors, catering to specific application requirements or enhanced security measures.

The intricate network of subsystems and components within the client computing architecture (1100) is interconnected via a system bus (1195). This communication pathway enables efficient data transfer between the processing subsystem (1105), memory subsystem (1135), storage subsystem (1150), and client I/O subsystem (1170). The system bus (1195) may employ various bus architectures and protocols, each optimized to maximize data transfer rates and minimize latency, ensuring smooth and efficient operation of the system.

The modular design philosophy underlying the client computing architecture (1100) affords a high degree of flexibility in configuration and future upgrades. Components within each subsystem may be designed for interchangeability or upgradability, allowing the architecture to evolve in tandem with technological advancements and changing user requirements. This modularity extends to key components such as the central processing unit (1110) and graphics processing unit (1125), which may be upgraded to more powerful versions without necessitating wholesale changes to other subsystems.

Energy efficiency is a consideration in the design of the client computing architecture (1100), with various power management features implemented to optimize energy consumption. Individual components or subsystems may be engineered with the capability to dynamically transition to low-power states or completely power down when not in active use. This sophisticated power management approach contributes to extended battery life in portable devices and reduced energy consumption in stationary systems, aligning with modern energy conservation imperatives.

Security considerations are deeply integrated into the client computing architecture (1100), with various features implemented at both the hardware and firmware levels. The processing subsystem (1105) may incorporate secure enclaves or trusted execution environments, providing isolated processing capabilities for sensitive operations. These secure processing zones offer an additional layer of protection for critical data and processes. Within the storage subsystem (1150), hardware-based encryption mechanisms may be employed to protect data at rest, safeguarding against unauthorized access even in the event of physical theft or tampering. The network interface controller (1180) may implement advanced security protocols to protect data in transit, ensuring the confidentiality and integrity of information as it traverses networks.

Through the integration of these diverse subsystems and components, the client computing architecture (1100) establishes itself as a comprehensive and adaptable platform capable of addressing a wide spectrum of computing tasks. Its versatility extends from general-purpose applications to specialized workloads in domains such as graphics processing, artificial intelligence, and data analysis, positioning it as a robust solution for diverse computing needs in both personal and professional contexts.

Server-Client Network Architecture

Figure 9:
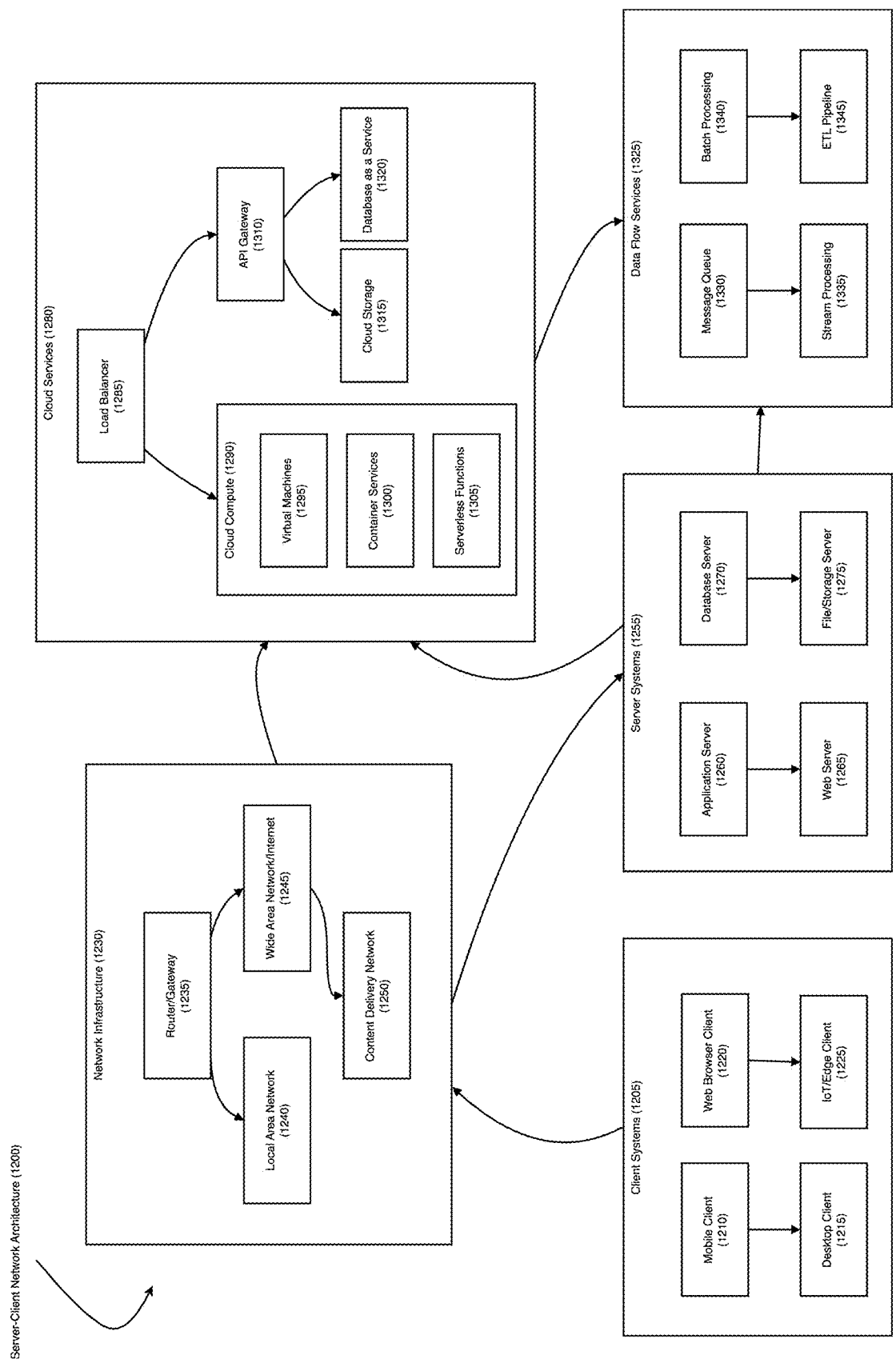
FIG. 9 illustrates a server-client network architecture, in accordance with example embodiments.

FIG. 9 illustrates a server-client network architecture (1200) that represents a comprehensive data processing ecosystem. This architecture encompasses a multifaceted array of interconnected components, including client systems, network infrastructure, server systems, and cloud services, each fulfilling a role in facilitating data processing and communication within the network.

The server-client network architecture (1200) initiates with client systems (1205), which serve as the primary interface for end-users to interact with the network. These client systems (1205) exhibit significant diversity to accommodate a wide spectrum of user requirements and usage scenarios. The mobile client (1210) category may encompass smartphones, tablets, and other portable computing devices, enabling users to access network resources with a high degree of mobility and flexibility. These devices typically incorporate cellular or wireless networking capabilities, allowing for seamless connectivity across various geographical locations.

In contrast, the desktop client (1215) represents a more stationary and potentially more powerful computing platform, commonly deployed in office or home environments. Desktop clients may offer enhanced processing capabilities, larger display options, and a wider array of peripheral device connections, making them suitable for tasks requiring sustained computational power or extended user interaction sessions.

The web browser client (1220) introduces a platform-agnostic approach to accessing network resources. This client type leverages standardized web technologies such as HTML5, CSS3, and JavaScript to provide a consistent user experience across different operating systems and devices. Web browser clients may support progressive web applications (PWAs) that offer near-native app functionality within the browser environment.

The IoT/edge client (1225) category encompasses a diverse range of specialized devices and sensors designed to collect and transmit data from the network's periphery. These clients may include industrial sensors, smart home devices, wearable technology, and various other Internet of Things (IoT) endpoints. IoT/edge clients often operate with constrained resources and may employ lightweight communication protocols such as MQTT or CoAP to efficiently transmit data to centralized processing systems.

Connecting these heterogeneous client systems (1205) to the broader network ecosystem is the network infrastructure (1230). This infrastructure forms the foundational backbone for data transmission and communication between the various components of the server-client network architecture (1200). At the heart of this infrastructure lies the router/gateway (1235), which functions as a central node for managing traffic flow and routing data between different network segments. Modern router/gateway devices often incorporate advanced features such as Quality of Service (QOS) management, Virtual Private Network (VPN) support, and intrusion detection systems. In many implementations, the router/gateway (1235) also serves as a firewall, providing a first line of defense against unauthorized access and potential security threats.

The network infrastructure (1230) typically includes a local area network (1240) component, which facilitates high-speed communication between devices within a confined geographical area, such as an office building or educational campus. Local area networks may employ technologies such as Ethernet, Wi-Fi, or optical fiber connections to achieve high bandwidth and low latency communication between local devices. These networks often implement network segmentation techniques, such as Virtual LANs (VLANs), to enhance security and optimize traffic flow.

For broader connectivity requirements, the wide area network/internet (1245) component extends the reach of the network across larger geographical distances. This component enables communication between geographically dispersed locations, leveraging technologies such as leased lines, MPLS (Multiprotocol Label Switching), or software-defined wide area networks (SD-WAN) to establish reliable and secure long-distance connections. The wide area network/internet component may also incorporate redundant paths and failover mechanisms to ensure continuous connectivity in the event of link failures.

To optimize content delivery and reduce latency for end-users, the network infrastructure (1230) may incorporate a content delivery network (1250). This specialized network overlay distributes cached content across multiple servers strategically positioned in proximity to end-users. Content delivery networks employ sophisticated algorithms to route user requests to the nearest available server, minimizing latency and reducing the load on origin servers. These networks may also provide additional services such as DDOS protection, SSL/TLS acceleration, and real-time analytics on content delivery performance.

Included in the server-client network architecture (1200) are the server systems (1255), which provide a wide array of services and resources to the client systems (1205). The application server (1260) component is responsible for hosting and managing software applications, handling complex business logic, and executing data processing tasks. Application servers may employ various technologies such as Java EE, .NET, or Node.js, and often implement clustering and load balancing techniques to ensure high availability and scalability.

The web server (1265) component focuses on serving web content and handling HTTP requests from web browser clients (1220). Web servers may utilize software such as Apache, Nginx, or Microsoft IIS to efficiently process incoming requests, serve static content, and route dynamic requests to appropriate application servers. These servers often implement caching mechanisms, compression algorithms, and SSL/TLS encryption to optimize performance and security.

For data storage and management requirements, the database server (1270) provides robust database services, ensuring data integrity and efficient querying capabilities. Database servers may support various database management systems (DBMS) such as MySQL, PostgreSQL, Oracle, or Microsoft SQL Server, each offering specific features and optimizations. Advanced database servers may implement techniques such as sharding, replication, and partitioning to handle large-scale data storage and high-volume query processing.

The file/storage server (1275) offers centralized file storage and sharing capabilities, allowing users to access and manage documents and other digital assets across the network. These servers may employ technologies such as Network Attached Storage (NAS) or Storage Area Networks (SAN) to provide scalable and reliable storage solutions. File/storage servers often implement advanced features such as data deduplication, snapshots, and hierarchical storage management to optimize storage utilization and data protection.

To enhance scalability, flexibility, and resource utilization, the server-client network architecture (1200) incorporates cloud services (1280). These cloud services extend the capabilities of traditional server systems by leveraging distributed computing resources, offering on-demand scalability and reduced operational overhead. A component in managing cloud resources is the load balancer (1285), which distributes incoming network traffic across multiple servers or cloud instances. Load balancers may employ various algorithms such as round-robin, least connections, or IP hash to optimize resource utilization and ensure high availability.

The cloud compute (1290) resources within the cloud services (1280) provide scalable processing power for a wide range of applications and workloads. These resources may be offered in various service models, including Infrastructure as a Service (IaaS), Platform as a Service (PaaS), or Software as a Service (SaaS). Virtual machines (1295) represent one form of cloud compute resource, offering virtualized computing environments that can be rapidly provisioned and scaled based on demand. Virtual machines provide isolation between different workloads and allow for flexible resource allocation.

Container services (1300) offer a more lightweight and portable approach to application deployment. Containers encapsulate an application and its dependencies, providing consistency across different environments and enabling rapid deployment and scaling. Container orchestration platforms such as Kubernetes or Docker Swarm may be employed to manage large-scale container deployments, handling tasks such as load balancing, service discovery, and automated scaling.

For event-driven and highly scalable computing requirements, serverless functions (1305) allow developers to run code without managing the underlying infrastructure. This paradigm, often referred to as Function as a Service (FaaS), enables fine-grained scaling and pay-per-execution pricing models. Serverless platforms may provide automatic scaling, built-in high availability, and integration with various event sources and cloud services.

The API gateway (1310) serves as a central point of entry for client applications to access various backend services and resources. This component handles tasks such as request routing, API composition, and protocol translation, simplifying the integration of different services and APIs. API gateways may implement features such as rate limiting, caching, authentication, and request/response transformation to enhance security and optimize performance.

For data storage requirements in the cloud environment, cloud storage (1315) provides scalable and durable storage solutions. These services may offer various storage classes optimized for different access patterns and cost requirements. Cloud storage solutions often implement features such as versioning, lifecycle management, and cross-region replication to enhance data durability and availability.

The database as a service (1320) offering provides fully managed database solutions, reducing the operational overhead associated with maintaining database infrastructure. These services may support various database types, including relational, NoSQL, and in-memory databases, each optimized for specific use cases and data models. Managed database services often provide automated backups, patching, and scaling capabilities, allowing organizations to focus on data utilization rather than infrastructure management.

To facilitate the movement and processing of data within the server-client network architecture (1200), data flow services (1325) play a role. The message queue (1330) component enables asynchronous communication between different system components, improving scalability and reliability. Message queues may implement features such as guaranteed delivery, message persistence, and publish-subscribe patterns to support various communication scenarios.

For real-time data processing requirements, stream processing (1335) capabilities allow for continuous analysis of data streams as they are generated. Stream processing engines may employ techniques such as windowing, aggregation, and complex event processing to derive insights from high-velocity data streams. These systems often provide low-latency processing and the ability to handle out-of-order or late-arriving data.

Batch processing (1340) capabilities handle large volumes of data in scheduled or periodic jobs, suitable for tasks that do not require real-time processing. Batch processing systems may leverage distributed computing frameworks such as Apache Hadoop or Apache Spark to process vast amounts of data efficiently. These systems often implement features such as fault tolerance, data partitioning, and resource management to optimize large-scale data processing tasks.

The ETL (Extract, Transform, Load) pipeline (1345) manages the extraction, transformation, and loading of data between different systems or data stores. ETL pipelines ensure data consistency and integrity across the architecture by applying a series of operations to transform raw data into a format suitable for analysis or reporting. Modern ETL systems may support both batch and real-time data integration scenarios, often leveraging cloud-native services for scalability and cost-efficiency.

The server-client network architecture (1200) implements advanced security measures to protect data and resources throughout the system. The network infrastructure (1230) may employ encryption protocols such as TLS/SSL for data in transit, while cloud services (1280) may offer encryption at rest for stored data. The API gateway (1310) typically implements robust authentication and authorization mechanisms, such as OAuth 2.0 or JWT (JSON Web Tokens), to control access to backend services.

To accommodate diverse deployment requirements, the server-client network architecture (1200) supports hybrid deployment models. This approach allows organizations to combine on-premises infrastructure with cloud services, enabling businesses to maintain control over sensitive data or legacy systems while leveraging the scalability and flexibility of cloud resources for other workloads. Hybrid deployments may utilize technologies such as VPN connections, direct links, or cloud-native hybrid services to create a seamless integration between on-premises and cloud environments.

Reliability and fault tolerance are considerations in the server-client network architecture (1200). The architecture implements redundancy and failover mechanisms across various components to enhance system resilience. Server systems (1255) may be configured in high-availability clusters, utilizing techniques such as active-active or active-passive configurations to ensure continuous service availability. Cloud services (1280) often leverage multi-region deployments, distributing resources across geographically diverse data centers to mitigate the impact of localized failures and ensure business continuity.

The data flow services (1325) within the server-client network architecture (1200) support both real-time and batch processing paradigms, allowing for flexible data handling based on specific application requirements. In some implementations, the architecture may adopt lambda or kappa architectures for big data processing. These architectural patterns combine stream and batch processing capabilities to handle large-scale data analytics workloads efficiently. Lambda architecture separates the processing into batch and speed layers, while kappa architecture treats all data as a stream, simplifying the overall system design.

By integrating these diverse components and services, the server-client network architecture (1200) provides a comprehensive and flexible framework for constructing scalable, resilient, and efficient data processing systems. The modular nature of the architecture enables organizations to adapt and extend their infrastructure as technology evolves and business requirements change. This adaptability ensures long-term viability and performance across a wide spectrum of computing environments, from edge computing scenarios to large-scale distributed systems. The architecture's emphasis on scalability, security, and interoperability positions it as a robust foundation for modern data-driven applications and services.

Throughout this disclosure, various terms and phrases are used to describe features of the disclosed technology. It is to be understood that these terms and phrases may encompass a variety of meanings and definitions, as is common in the field of technology and patent law. The definitions of these terms may vary depending on the context in which they are used, the specific embodiment being described, or the interpretation of the technology by those skilled in the art.

In various embodiments, certain variable names, symbols, or labels may be used in the claims to represent various elements, components, or steps of the described methods, systems, and apparatuses. These variable names, symbols, or labels are provided for convenience and clarity in describing the claimed subject matter. However, it should be understood that the use of such variable names, symbols, or labels in the claims does not necessarily limit these elements, components, or steps to being the same specific entities described in the specification or in other parts of the disclosure. The variable names, symbols, or labels used in the claims should be interpreted broadly and may encompass various implementations, variations, or equivalents of the described elements, components, or steps, unless explicitly stated otherwise or clearly limited by the context of the claim. As such, the scope of the claims is not confined to the specific examples or embodiments described in the specification, but rather extends to the full breadth of the inventive concepts disclosed herein.

For instance, terms such as "computing device," "processor," "memory," and "network" may refer to a wide range of devices, components, systems, and configurations known in the art, and their specific definitions may differ based on the implementation or design of the system. Similarly, phrases like "securely storing," "computing a vector," and "generating a message" may involve various methods, techniques, and processes that achieve the same or similar outcomes but may be executed in different manners.

It is also to be understood that the use of terms in the singular or plural form is not intended to limit the scope of the claims. For example, the mention of "a computing device" does not preclude the presence of multiple computing devices within a system. Likewise, references to "a network" may include various interconnected networks or a single network comprising multiple segments or layers.

Furthermore, the use of the term "may" in relation to an action or feature indicates that the action or feature is possible, but not necessarily mandatory. This term is used to describe optional or alternative aspects of the disclosed technology that provide flexibility in how the technology may be implemented or utilized.

The definitions provided herein are intended to serve as examples and are not exhaustive. Those skilled in the art may ascribe different meanings to these terms based on the context, the specific technology being described, or the advancements in the field. Therefore, the definitions of the terms and phrases used in this disclosure and the claims are to be interpreted broadly and in a manner consistent with the understanding of those skilled in the relevant art.

The use of the word "a" or "an" when used in conjunction with the claims herein is to be interpreted as including one or more than one of the element it introduces. Similarly, the use of the term "or" is intended to be inclusive, such that the phrase "A or B" is intended to include A, B, or both A and B, unless explicitly stated otherwise.

Reference throughout the specification to "one embodiment," "another embodiment," "an embodiment," and so forth, means that a particular feature, structure, or characteristic described in connection with the embodiment is included in at least one embodiment of the present disclosure, and may not necessarily be present in all embodiments. Furthermore, the particular features, structures, or characteristics may be combined in any suitable manner in one or more embodiments without limitation.

The use of the terms "first," "second," and the like does not imply any order or sequence, but are used to distinguish one element from another, and the terms "top," "bottom," "front," "back," "leading," "trailing," and the like are used for descriptive purposes and are not necessarily to be construed as limiting.

As used herein, the term "processor" refers to any computing entity capable of executing instructions to perform a specific set of operations, whether implemented in hardware, firmware, software, or any combination thereof. This definition includes a broad range of processing technologies and architectures. The term encompasses general-purpose processors such as Central Processing Units (CPUs), specialized processors such as Graphics Processing Units (GPUs), as well as highly specialized hardware accelerators such as Neural Processing Units (NPUs) for artificial intelligence applications and Tensor Processing Units (TPUs) for machine learning workloads.

The term also encompasses reconfigurable computing architectures such as Field-Programmable Gate Arrays (FPGAs) for applications requiring specialized processing configurations, Application-Specific Integrated Circuits (ASICs), Digital Signal Processors (DSPs), Systolic Array Processors, and emerging computing paradigms such as Quantum Processors that leverage principles of quantum mechanics. System on Chip (SoC) designs, heterogeneous computing systems, Edge Computing Processors for distributed network applications, cloud-based and distributed processors, multi-core and parallel processors, and Neuromorphic processors that draw inspiration from biological neural architectures are all encompassed within this definition.

The term "processor" also encompasses the associated memory hierarchies, including primary memory (such as RAM), secondary storage (such as hard drives and SSDs), and cache memory, which work in conjunction with the processor to store and retrieve data necessary for executing instructions. In this patent application, any reference to a "processor" should be interpreted broadly to include any type of processing unit capable of performing the described functions, regardless of its specific implementation, architecture, or physical form.

As used herein, the term "messages" may refer to any form of data or information that can be processed, transmitted, or stored in a digital format. Messages may include arbitrary-length plaintext messages, pre-hashed messages, concatenated messages, binary data, network protocol messages, database records, and time-stamped messages. Messages may be composed of characters, symbols, or binary data and may represent various forms of content such as text, numbers, multimedia, executable code, or any other data that can be digitally encoded. Messages may be used as input for cryptographic functions, such as keyed hash functions, where they are transformed into a fixed-size hash value influenced by a secret cryptographic key.

The term "messages" encompasses a wide range of data types and structures, from simple text strings to complex structured data, and may include metadata, headers, footers, or other information that facilitates the processing, transmission, or interpretation of the content. Messages may be generated by users, systems, or processes and may be intended for various purposes, including communication, authentication, verification, logging, or any other function that involves the use of digital data.

Messages may also include data formats specific to artificial intelligence and machine learning applications, such as tensors, feature vectors, embeddings, model parameters, activation maps, training examples, and inference requests. In distributed and edge computing contexts, the term "messages" further extends to include event streams, state updates, service requests, synchronization messages, and smart contract transactions used in blockchain platforms.

As used herein, the terms "store," "storing," "storage," or variants thereof refer to any means, methods, systems, or processes for recording, retaining, or preserving data in a retrievable format. This terminology encompasses a broad spectrum of technologies and mechanisms that may be employed to maintain information for future access or reference.

The term includes traditional electronic storage technologies such as magnetic storage (including hard disk drives, magnetic tape, and floppy disks), optical storage (including optical discs, holographic storage, and optical tape), and solid-state storage (including solid-state drives, flash memory, static random-access memory, dynamic random-access memory, and read-only memory). It also encompasses emerging storage technologies such as DNA storage, molecular storage, quantum storage, and photonic storage.

Storage terminology may refer to various architectural organizations and hierarchies of data repositories. This includes primary storage (main memory, cache memory) designed for rapid access during processing operations; secondary storage providing non-volatile retention of larger data volumes; and tertiary storage for archival purposes. The terminology extends to distributed storage architectures such as network-attached storage (NAS), storage area networks (SAN), direct-attached storage (DAS), and object storage systems. It also includes cloud-based storage configurations, including public, private, and hybrid cloud storage implementations; edge storage systems located at network peripheries; and fog storage systems distributed between centralized and edge locations.

The definition encompasses storage virtualization technologies that abstract physical storage resources and present them as logical storage units, including virtual disks, software-defined storage, and storage hypervisors. It also includes storage orchestration systems that manage data placement, replication, and migration across distributed infrastructures.

The terminology extends to various data organization and management paradigms. This includes file systems that organize data into files and directories; block storage systems that manage data as fixed-sized blocks; object storage systems that handle data as discrete objects with metadata; and content-addressable storage systems that retrieve data based on content rather than location. It also includes specialized storage structures such as databases, data lakes, data warehouses, and knowledge repositories.

Storage terminology encompasses various operational characteristics and capabilities of storage systems. This includes persistent storage that maintains data integrity across power cycles; volatile storage that requires continuous power to retain data; and non-volatile storage that preserves data without power. It also includes immutable storage that prevents modification of stored data; append-only storage that allows additions but not modifications; and version-controlled storage that maintains historical states of data. The term further encompasses encrypted storage that protects data confidentiality; redundant storage that duplicates data to prevent loss; and resilient storage that maintains availability despite component failures.

In specialized computing contexts, storage terminology may refer to domain-specific storage mechanisms. For blockchain and distributed ledger technologies, this includes on-chain storage within the blockchain itself and off-chain storage that maintains references to externally stored data. For neural networks and artificial intelligence systems, it includes weight storage for maintaining learned parameters and activation storage for intermediate computational results. For quantum computing systems, it refers to quantum state storage that preserves quantum information, while for edge computing, it includes transient storage for temporary data processing at network boundaries.

The term "storage" also encompasses the protocols, interfaces, and access methods used to interact with stored data. This includes file access protocols (such as NFS, SMB, and HDFS), block access protocols (such as iSCSI, Fibre Channel, and ATA), and object access protocols (such as S3, Swift, and CDMI). It also includes direct memory access mechanisms, memory-mapped file interfaces, and storage controller interfaces.

The term "database" should be construed to mean a blockchain, distributed ledger technology, key-value store, document-oriented database, graph database, time-series database, in-memory database, columnar database, object-oriented database, hierarchical database, network database, or any other structured data storage system capable of storing and retrieving information. This may include traditional relational database management systems (RDBMS), NoSQL databases, NewSQL databases, or hybrid database systems that combine multiple database paradigms. The database may be centralized, distributed, or decentralized, and may employ various data models, indexing strategies, and query languages to organize and access the stored information. It may also incorporate features such as ACID (Atomicity, Consistency, Isolation, Durability) compliance, eventual consistency, sharding, replication, or partitioning to ensure data integrity, availability, and scalability. The database may be hosted on-premises, in the cloud, or in a hybrid environment, and may support various access methods including direct queries, API calls, or event-driven architectures.

The term "database" further encompasses specialized data storage and management systems designed for particular domains or use cases. This includes blockchain and distributed ledger technologies used for secure, decentralized transaction records, edge databases optimized for resource-constrained environments, vector databases for high-dimensional data, time-series databases for temporal data management, knowledge graphs for representing interconnected information, federated or distributed databases for integrating autonomous systems, and emerging paradigms such as quantum databases that leverage quantum computing principles.

The terms "connected," "coupled," or any variant thereof, mean any direct or indirect connection or coupling between two or more elements, and may encompass the presence of one or more intermediate elements between the two elements that are connected or coupled to each other.

In the context of modern computing architectures and network topologies, these terms may also refer to various connection modalities. This includes physical connections through wired or wireless interfaces, logical connections operating independently of the physical layer, API connections allowing software components to communicate, and microservice connections in distributed architectures. The terminology extends to edge-to-cloud connections for distributed processing environments, blockchain connections for distributed ledger systems, quantum connections for secure communication, and neural network connections for artificial intelligence systems.nyu As used herein, the term "display" or "displaying" refers to any means, method, apparatus, or process for visually presenting or otherwise conveying information to a user. This terminology encompasses a broad spectrum of technologies and presentation modalities that may be employed to render content perceivable by a user. The term includes traditional display technologies such as cathode ray tubes (CRTs), liquid crystal displays (LCDs), light-emitting diode (LED) displays, organic light-emitting diode (OLED) displays, micro-LED displays, and electronic paper displays. It also encompasses specialized display types such as transparent displays, flexible displays, foldable displays, stretchable displays, and holographic displays.

The term "display" may also refer to projection systems, including traditional projectors, laser projectors, pico projectors, and holographic projection systems. It further includes immersive display technologies such as head-mounted displays (HMDs), virtual reality (VR) headsets, augmented reality (AR) glasses, mixed reality (MR) systems, and smart contact lenses. The terminology extends to ambient display methods that integrate visual information into the environment, such as smart mirrors, interactive surfaces, projection mapping systems, and volumetric displays.

The definition also encompasses non-visual display modalities that may complement or substitute for visual displays. This includes auditory displays such as speech output systems, sonification interfaces, and spatial audio; haptic displays that communicate through tactile feedback, vibration patterns, or force feedback; and other sensory output mechanisms such as olfactory displays and thermotactile interfaces. Multimodal displays that combine multiple sensory channels for information presentation are also included within this terminology.

The term "display" further encompasses the software and computational components involved in rendering information. This includes rendering engines, graphics processing pipelines, display servers, and compositing systems. It also includes specialized display rendering techniques such as rasterization, ray tracing, vector graphics, procedural generation, and neural rendering. The term extends to user interface paradigms such as graphical user interfaces (GUIs), natural user interfaces (NUIs), voice user interfaces (VUIs), brain-computer interfaces (BCIs), and ambient intelligence systems.

In the context of accessibility, the term "display" includes assistive technologies and alternative display methods designed to accommodate diverse user needs. This encompasses screen readers, braille displays, audio descriptions, high-contrast modes, color-shifted presentations, and other adaptive display mechanisms. The terminology also includes display personalization techniques such as adaptive interfaces, contextual displays, and user-specific rendering optimizations.

The description of the embodiments of the present disclosure is intended to be illustrative, and not to limit the scope of the claims. Many alternatives, modifications, and variations will be apparent to those skilled in the art. A number of implementations have been described. Nevertheless, it will be understood that various modifications may be made without departing from the spirit and scope of the disclosure. Accordingly, other implementations are within the scope of the following claims.

The invention claimed is:

1. A method for orchestrating automated data processing and transformation, comprising:

receiving, by a centralized orchestrator, a request to process a dataset associated with a client;

initiating, by the orchestrator, a data ingestion process to obtain sample data from the dataset, wherein the data ingestion process is executed on client premises or in a cloud environment;

analyzing, by a semantic analysis module controlled by the orchestrator, the sample data to determine semantic types of data fields within the dataset;

generating, by a transformation module controlled by the orchestrator, data transformation instructions based on the determined semantic types;

deploying, by the orchestrator, a data processing pipeline to a client-controlled environment, wherein the pipeline is executed within the client premises;

configuring, by the orchestrator, privacy preservation parameters for the data processing pipeline to identify and obfuscate potential personally identifiable information (PII) in the dataset;

instructing the data processing pipeline to apply the data transformation instructions and privacy preservation parameters to the dataset;

determining, by a configuration module controlled by the orchestrator, data storage configurations for the transformed dataset;

directing the storage of the transformed dataset according to the determined data storage configurations, wherein the storage occurs in a client-controlled environment or a cloud environment;

generating, by a machine learning module that is executed in the cloud or on client premises, a machine learning model based on the transformed dataset; and storing the machine learning model in a model repository accessible to the client.

2. The method of claim 1, further comprising:

implementing access controls for the transformed dataset or machine learning model through role-based permission systems with cryptographic verification;

tracking data lineage throughout the transformation process using a directed acyclic graph (DAG) representation with cryptographic hashes;

optimizing query performance on the transformed dataset using automated indexing based on identified access patterns;

scheduling recurring data processing jobs based on configurable parameters; or providing programmatic access to the orchestrated functionalities through APIs.

3. The method of claim 1, wherein analyzing the sample data to determine semantic types comprises:

applying a transformer-based machine learning classifier to predict semantic types;

validating the predicted semantic types using pattern matching or contextual analysis;

generating confidence scores for one or more predicted semantic type;

refining the semantic type predictions based on statistical analysis of the sample data; or generating human-readable descriptions of identified semantic types.

4. The method of claim 1, wherein generating data transformation instructions comprises:

identifying one or more required data normalization steps based on the determined semantic types;

generating SQL-based transformation queries to standardize data formats;

creating data quality validation rules to ensure consistency of transformed data;

optimizing the transformation instructions for distributed execution; or automatically generating documentation of transformation logic.

5. The method of claim 1, wherein configuring privacy preservation parameters comprises:

implementing k-anonymity algorithms for categorical data fields;

creating encrypted views of sensitive data fields while maintaining referential integrity; or generating privacy impact assessments that quantify re-identification risk.

6. The method of claim 1, wherein deploying the data processing pipeline comprises:

generating a directed acyclic graph (DAG) representation of the transformation steps;

optimizing the DAG for parallel execution based on data dependencies;

implementing checkpointing mechanisms to ensure pipeline resilience;

dynamically scaling pipeline resources based on data volume; or implementing secure communication channels between pipeline components.

7. The method of claim 1, wherein generating the machine learning model comprises:

selecting model architectures based on the semantic types identified in the transformed dataset;

implementing distributed learning techniques to train models while preserving data privacy;

applying transfer learning to leverage pre-trained models relevant to the identified semantic types; or continuously refining the model using incremental learning techniques.

8. A system for orchestrating automated data processing and transformation, comprising:

a centralized orchestrator implemented on a server system comprising at least one processor and memory;

a client computing architecture comprising at least one processor and memory;

wherein the centralized orchestrator is configured to:

receive a request to process a dataset associated with a client;

initiate a data ingestion process to obtain sample data from the dataset, wherein the data ingestion process is executed on the client computing architecture or in a cloud environment;

control a semantic analysis module to analyze the sample data to determine semantic types of data fields within the dataset;

control a transformation module to generate data transformation instructions based on the determined semantic types;

deploy a data processing pipeline to the client computing architecture;

configure privacy preservation parameters for the data processing pipeline to identify and obfuscate potential personally identifiable information (PII) in the dataset;

instruct the data processing pipeline to apply the data transformation instructions and privacy preservation parameters to the dataset;

control a configuration module to determine data storage configurations for the transformed dataset;

direct the storage of the transformed dataset according to the determined data storage configurations, wherein the storage occurs in the client computing architecture or the cloud environment;

control a machine learning module executed in the cloud environment or on the client computing architecture to generate a machine learning model based on the transformed dataset; and store the machine learning model in a model repository accessible to the client.

9. The system of claim 8, wherein the centralized orchestrator is further configured to:

implement access controls for the transformed dataset or machine learning model through role-based permission systems with cryptographic verification;

track data lineage throughout the transformation process using a directed acyclic graph (DAG) representation with cryptographic hashes;

optimize query performance on the transformed dataset using automated indexing based on identified access patterns;

schedule recurring data processing jobs based on configurable parameters; or provide programmatic access to the orchestrated functionalities through APIs.

10. The system of claim 8, wherein the semantic analysis module is configured to:

apply a transformer-based machine learning classifier to predict semantic types;
validate the predicted semantic types using pattern matching or contextual analysis;
generate confidence scores for one or more predicted semantic type;
refine the semantic type predictions based on statistical analysis of the sample data; or
generate human-readable descriptions of identified semantic types.

11. The system of claim 8, wherein the transformation module is configured to:
identify one or more required data normalization steps based on the determined semantic types;
generate SQL-based transformation queries to standardize data formats;
create data quality validation rules to ensure consistency of transformed data;
optimize the transformation instructions for distributed execution; or
automatically generate documentation of transformation logic.

12. The system of claim 8, wherein configuring privacy preservation parameters comprises:
implement k-anonymity algorithms for categorical data fields;
create encrypted views of sensitive data fields while maintaining referential integrity; or
generate privacy impact assessments that quantify re-identification risk.

13. The system of claim 8, wherein deploying the data processing pipeline comprises:
generate a directed acyclic graph (DAG) representation of the transformation steps;
optimize the DAG for parallel execution based on data dependencies;
implement checkpointing mechanisms to ensure pipeline resilience;
dynamically scale pipeline resources based on data volume; or
implement secure communication channels between pipeline components.

14. The system of claim 8, wherein the machine learning module is configured to:
select model architectures based on the semantic types identified in the transformed dataset;
implement distributed learning techniques to train models while preserving data privacy;
apply transfer learning to leverage pre-trained models relevant to the identified semantic types; or
continuously refine the model using incremental learning techniques.

15. A non-transitory computer-readable medium storing instructions that, when executed by one or more processors, cause the one or more processors to perform operations comprising:
receiving a request to process a dataset associated with a client;
initiating a data ingestion process to obtain sample data from the dataset, wherein the data ingestion process is executed on client premises or in a cloud environment;
analyzing, by a semantic analysis module, the sample data to determine semantic types of data fields within the dataset;
generating, by a transformation module, data transformation instructions based on the determined semantic types;
deploying a data processing pipeline to a client-controlled environment, wherein the pipeline is executed within the client premises;
configuring privacy preservation parameters for the data processing pipeline to identify and obfuscate potential personally identifiable information (PII) in the dataset;
instructing the data processing pipeline to apply the data transformation instructions and privacy preservation parameters to the dataset;
determining, by a configuration module, data storage configurations for the transformed dataset;
directing the storage of the transformed dataset according to the determined data storage configurations, wherein the storage occurs in a client-controlled environment or a cloud environment;
generating, by a machine learning module that is executed in the cloud or on client premises, a machine learning model based on the transformed dataset; and
storing the machine learning model in a model repository accessible to the client.

16. The non-transitory computer-readable medium of claim 15, wherein the operations further comprise:
implementing access controls for the transformed dataset or machine learning model through role-based permission systems with cryptographic verification;
tracking data lineage throughout the transformation process using a directed acyclic graph (DAG) representation with cryptographic hashes;
optimizing query performance on the transformed dataset using automated indexing based on identified access patterns;
scheduling recurring data processing jobs based on configurable parameters; or
providing programmatic access to the orchestrated functionalities through APIs.

17. The non-transitory computer-readable medium of claim 15, wherein analyzing the sample data to determine semantic types comprises:
applying a transformer-based machine learning classifier to predict semantic types;
validating the predicted semantic types using pattern matching or contextual analysis;
generating confidence scores for at least one predicted semantic type;
refining the semantic type predictions based on statistical analysis of the sample data; or
generating human-readable descriptions of identified semantic types.

18. The non-transitory computer-readable medium of claim 15, wherein generating data transformation instructions comprises:
identifying one or more required data normalization steps based on the determined semantic types;
generating SQL-based transformation queries to standardize data formats;
creating data quality validation rules to ensure consistency of transformed data;
optimizing the transformation instructions for distributed execution; or
automatically generating documentation of transformation logic.

19. The non-transitory computer-readable medium of claim 15, wherein configuring privacy preservation parameters comprises:
implementing k-anonymity algorithms for categorical data fields;

creating encrypted views of sensitive data fields while maintaining referential integrity; or generating privacy impact assessments that quantify re-identification risk.

20. The non-transitory computer-readable medium of claim 15, wherein deploying the data processing pipeline comprises:

generating a directed acyclic graph (DAG) representation of the transformation steps;

optimizing the DAG for parallel execution based on data dependencies;

implementing checkpointing mechanisms to ensure pipeline resilience;

dynamically scaling pipeline resources based on data volume; or implementing secure communication channels between pipeline components.

\* \* \* \* \*